(12) United States Patent
Parsont

(10) Patent No.: US 12,236,803 B1
(45) Date of Patent: Feb. 25, 2025

(54) COMPUTERIZED TEST MONITORING SYSTEM AND METHOD OF USE

(71) Applicant: Neil Parsont, Naples, FL (US)

(72) Inventor: Neil Parsont, Naples, FL (US)

( * ) Notice: Subject to any disclaimer, the term of this patent is extended or adjusted under 35 U.S.C. 154(b) by 98 days.

(21) Appl. No.: 18/107,473

(22) Filed: Feb. 8, 2023

Related U.S. Application Data

(63) Continuation-in-part of application No. 17/529,243, filed on Nov. 17, 2021, now Pat. No. 11,996,010.

(60) Provisional application No. 63/308,006, filed on Feb. 8, 2022, provisional application No. 63/120,185, filed on Dec. 1, 2020.

(51) Int. Cl.
*G09B 7/00* (2006.01)
*G06Q 10/1091* (2023.01)
*H04N 7/18* (2006.01)

(52) U.S. Cl.
CPC .......... *G09B 7/00* (2013.01); *G06Q 10/1091* (2013.01); *H04N 7/183* (2013.01)

(58) Field of Classification Search
CPC . G09B 7/00; G09B 5/00; H04N 7/183; G06Q 10/1091
See application file for complete search history.

(56) References Cited

U.S. PATENT DOCUMENTS

| | | | |
|---|---|---|---|
| 8,233,672 B2 | 7/2012 | Matos | |
| 2007/0048723 A1* | 3/2007 | Brewer | G09B 7/02 434/350 |
| 2012/0176220 A1* | 7/2012 | Garcia | G06F 21/32 340/5.83 |
| 2013/0266926 A1 | 10/2013 | Cano | |
| 2015/0037781 A1* | 2/2015 | Breed | G09B 7/00 434/362 |
| 2015/0099256 A1 | 4/2015 | Liu et al. | |
| 2015/0188838 A1* | 7/2015 | Bhattacharya | G09B 5/00 709/225 |
| 2019/0132338 A1* | 5/2019 | Shah | G09B 7/06 |
| 2019/0197911 A1* | 6/2019 | Anderson | H04L 63/06 |

* cited by examiner

*Primary Examiner* — Robert J Utama
*Assistant Examiner* — Correll T French
(74) *Attorney, Agent, or Firm* — Allen D Hertz, P. A.; Allen D. Hertz

(57) ABSTRACT

A system and a method of using the system for proctoring of a computer administered exam or test. The proctoring system includes software and at least two digital proctoring cameras arranged to capture at least: strokes on a keyboard, information displayed on a monitor, and activities of the examinee. The system can additionally capture video of the environment surrounding the testing computer, including monitoring and/or recording of activities on ancillary computing/communication devices located in the test environment. The information can be time stamped enabling synchronization thereof. The collected information is forwarded to a proctoring system, which can include artificial intelligence software to aid in monitoring the administration of the tests. A privacy screen can be employed to limit a viewing angle of the screen. The system includes a function of monitoring ancillary electronic devices, including management, monitoring, and/or recording of activities thereon.

26 Claims, 11 Drawing Sheets

COMPUTERIZED TEST MONITORING SYSTEM AND METHOD OF USE

CROSS REFERENCE TO RELATED APPLICATIONS

This application is:
A) a Continuation-In-Part claiming the benefit of U.S. Non-Provisional patent application Ser. No. 17/529,243, filed on Nov. 17, 2021,
   wherein U.S. Non-Provisional patent application Ser. No. 17/529,243 claims the benefit of United States Provisional Patent Application Ser. No. 63/120,185, filed on Dec. 1, 2020, and
B) a Non-Provisional Utility Application claiming the benefit of U.S. Provisional Patent Application Ser. No. 63/308,006, filed on Feb. 8, 2022,
C) wherein each of which are incorporated by reference herein in their entireties.

FIELD OF THE INVENTION

The present disclosure generally relates to a proctoring system for use during test taking by a computer and an associated method of using the proctoring system.

BACKGROUND OF THE INVENTION

Examinations or testing can be accomplished using any of a variety of testing media in any of a variety of environments. Testing media can include oral testing, written testing, computerized testing, and the like. Tests are commonly applied in accordance to at least one of the following formats: computer testing, multiple choice, true/false questions, matching, short answer responses, essay questions, scantron testing, oral testing, open-book testing, and research projects.

Computerized testing continues to increase in use across various examination processes. This can include education facilities (grade school (elementary school, middle school, high school), colleges, universities, scholastic exams (SAT, ACT, etc.), professional accreditations (state BAR examinations, real estate accreditations, accounting accreditations, architecture accreditations, and the like), and any other suitable testing process. Computerized testing can be accomplished while testing is administered at an education facility, in a testing facility, and more recently using an examinee's or candidate's computer at the examinee's or candidate's workplace, home, or other location. Test results are based upon a legitimacy of the test examination process and affirmation against cheating.

Many methods are being implemented to deter cheating during online or computer examinations.

One method is an application of screen sharing, where a testing proctor (administrator) can view the screen of an examinee.

A second method employs a webcam (camera commonly integrated into a top cross-member of a monitor frame of a laptop computer or a desktop computer monitor). This arrangement has numerous limitations. as one person stated: "I have given some online college admissions tests and got qualified but my friend who hadn't studied also got qualified with much better score through cheating (he said "you just have to adjust the camera angle to show your face and not hands and keep your mobile device in a non visible area and just type the questions online quickly without taking much time and act like you are solving something") done that's all it took to cheat."

Other methods that can be implemented to cheat include:
Students cheat on exams by either using their phone outside of the viewing area of the standard built in webcam (as stated above).

Cheating can be accomplished by having a second person in the room take photos or look at the screen to help them.

Including elicit notes on notes or other paperwork.

Use unapproved notes adhered to monitor using a small piece of paper with a re-adherable strip of glue on its back, made for temporarily attaching notes to documents and other surfaces.

Arranging to send a fake camera feed in place of the digital proctoring camera.

Taking notes pertaining to test questions and/or test answers to aid others that might take the same or similar test during a future test period. The notes can be taken on paper, on the computer, or using any other suitable manner.

What is desired is an arrangement of devices creating a system which significantly limits an examinee from cheating during an examination given through a computerized testing process.

BRIEF SUMMARY OF THE INVENTION

The present disclosure is generally directed to a proctoring system for monitoring an examinee during administration of a test, where the test is administered over a computer.

In a first aspect, the proctoring system includes:
  a first digital proctoring camera arranged to have digital communication with a proctor monitoring system;
  a second digital proctoring camera arranged to have digital communication with the proctor monitoring system; and
  proctoring software configured to interface with the first digital proctoring camera and the second digital proctoring camera,
  wherein the first digital proctoring camera in an orientation to capture video of the examinee's keyboard and a portion of the examinee, including at least one of an examinee's hands and an examinee's face,
  wherein the second digital proctoring camera in an orientation to capture video of a monitor screen of the examinee's computer and at least a portion of a desk supporting the examinee's computer.

In a second aspect, the proctoring system includes:
  a test proctoring kit, the test proctoring kit comprising:
    a first digital proctoring camera in one of direct or indirect digital communication with a proctor computer; and
    a second digital proctoring camera in one of direct or indirect digital communication with the proctor computer,
    wherein the first digital proctoring camera is positioned enabling acquisition of video of the examinee's keyboard and a portion of the examinee, including at least one of (a) an examinee's face and (b) at least one of an examinee's hands,
    wherein the second digital proctoring camera is positioned enabling acquisition of video of a monitor screen of the examinee's computer and at least a portion of a desk supporting the examinee's computer, wherein the second digital proctoring camera is arranged to capture video using a first viewing angle, the proctoring system employing monitoring steps of:
acquiring proctoring software;
initiating proctoring software;
acquiring video using the first digital proctoring camera;
conveying video acquired using the first digital proctoring camera to the proctor computer;
acquiring video using the second digital proctoring camera; and
conveying video acquired using the second digital proctoring camera to the proctor computer,
wherein the monitoring steps are accomplished by at least one of (a) a processor integral with the examinee's computer and (b) a processor integral with the proctoring computer.

In a second aspect, the first digital proctoring camera is integrated into a monitor of the examinee's computer.

In another aspect, the first digital proctoring camera is carried by the monitor of the examinee's computer.

In yet another aspect, the first digital proctoring camera is positioned above the monitor of the examinee's computer.

In yet another aspect, the first digital proctoring camera is positioned above the monitor of the examinee's computer in a central position.

In yet another aspect, the first digital proctoring camera is positioned above the monitor of the examinee's computer.

In yet another aspect, the first digital proctoring camera is oriented to acquire video of a keyboard associated with the examinee's computer, wherein the keyboard is supported by a keyboard tray.

In yet another aspect, the first digital proctoring camera is oriented to acquire video of a keyboard associated with the examinee's computer, wherein the keyboard is supported by a keyboard tray and the keyboard tray is located below a desktop of the desk supporting the examinee's computer.

In yet another aspect, the first digital proctoring camera is positioned enabling acquisition of video of the examinee's keyboard and the portion of the examinee, including (a) the examinee's face and (b) at least one of the examinee's hands.

In yet another aspect, the first digital proctoring camera is positioned enabling acquisition of video of the examinee's keyboard and the portion of the examinee, including (a) the examinee's face and (b) both of the examinee's hands.

In yet another aspect, the second digital proctoring camera is positioned enabling acquisition of video of at least one of the examinee's hands.

In yet another aspect, the second digital proctoring camera is positioned enabling acquisition of video of both of the examinee's hands.

In yet another aspect, the second digital proctoring camera is positioned enabling acquisition of video of the keyboard and at least one of the examinee's hands.

In yet another aspect, the second digital proctoring camera is positioned enabling acquisition of video of the keyboard and both of the examinee's hands.

In yet another aspect, the proctoring system further comprising:
a third digital proctoring camera in one of direct or indirect digital communication with the proctor computer,
wherein the third digital proctoring camera is positioned enabling acquisition of video of the monitor screen of the examinee's computer and at least a second portion of the desk supporting the examinee's computer, wherein the third digital proctoring camera is arranged to capture video using a second viewing angle;
the proctoring system further comprising additional monitoring steps of:
acquiring video using the third digital proctoring camera; and
conveying video acquired using the third digital proctoring camera to the proctor computer,
wherein the additional monitoring steps are accomplished by at least one of (a) a processor integral with the examinee's computer and (b) a processor integral with the proctoring computer.

In yet another aspect, at least one of the second digital proctoring camera and the third digital proctoring camera is positioned enabling acquisition of video of at least one of the examinee's hands.

In yet another aspect, at least one of the second digital proctoring camera and the third digital proctoring camera is positioned enabling acquisition of video of both of the examinee's hands.

In yet another aspect, at least one of the second digital proctoring camera and the third digital proctoring camera is positioned enabling acquisition of video of the keyboard and at least one of the examinee's hands.

In yet another aspect, at least one of the second digital proctoring camera and the third digital proctoring camera is positioned enabling acquisition of video of the keyboard and both of the examinee's hands.

In yet another aspect, the first digital proctoring camera is oriented to acquire video of an examinee's face.

In yet another aspect, the first digital proctoring camera is oriented to acquire video of an examinee's eyes.

In yet another aspect, the first digital proctoring camera is oriented to acquire video of the examinee's eyes, wherein the process further comprises eye tracking software.

In yet another aspect, the second digital proctoring camera is oriented to capture video of the monitor screen and at least a portion of a desk supporting the examinee's computer.

In yet another aspect, the second digital proctoring camera is oriented to capture video of the screen and an entire portion of the desk supporting the examinee's computer to one side of the examinee's keyboard.

In yet another aspect, the second digital proctoring camera is oriented to capture video of the screen and an entire desktop of the desk supporting the examinee's computer to one side of the examinee's keyboard.

In yet another aspect, the proctoring system further includes a third digital proctoring camera having connectivity to a proctor monitoring system.

In yet another aspect, the second digital proctoring camera is oriented to capture video of the monitor screen and a first portion of the desk supporting the examinee's computer and the third digital proctoring camera is oriented to capture video of the monitor screen and a second portion of the desk supporting the examinee's computer.

In yet another aspect, the second digital proctoring camera is oriented to capture video of the monitor screen and a first portion of the desk supporting the examinee's computer and the third digital proctoring camera is oriented to capture video of the monitor screen and a second portion of the desk supporting the examinee's computer, wherein the first portion of the desk and the second portion of the desk collectively capture video of the entire desktop of the desk supporting the examinee's computer.

In yet another aspect, at least one of the first digital proctoring camera, the second digital proctoring camera, and the third digital proctoring camera is connected to the examinee's computer.

In yet another aspect, at least one of the first digital proctoring camera, the second digital proctoring camera, and the third digital proctoring camera is connected to the examinee's computer using a Universal Serial Bus (USB) protocol.

In yet another aspect, at least one of the first digital proctoring camera, the second digital proctoring camera, and the third digital proctoring camera is connected to the examinee's computer using a Bluetooth protocol.

In yet another aspect, at least one of the first digital proctoring camera, the second digital proctoring camera, and the third digital proctoring camera is connected to the examinee's computer using a Wi-Fi protocol.

In yet another aspect, at least one of the first digital proctoring camera, the second digital proctoring camera, and the third digital proctoring camera is connected to a proctoring computer.

In yet another aspect, at least one of the first digital proctoring camera, the second digital proctoring camera, and the third digital proctoring camera is connected to a proctoring computer, wherein the proctoring computer is independent of the examinee's computer.

In yet another aspect, at least one of the first digital proctoring camera, the second digital proctoring camera, and the third digital proctoring camera is connected to a proctoring computer using a Universal Serial Bus (USB) protocol.

In yet another aspect, at least one of the first digital proctoring camera, the second digital proctoring camera, and the third digital proctoring camera is connected to the proctoring computer using a Bluetooth protocol.

In yet another aspect, at least one of the first digital proctoring camera, the second digital proctoring camera, and the third digital proctoring camera is connected to the proctoring computer using a Wi-Fi protocol.

In yet another aspect, at least one of the first digital proctoring camera, the second digital proctoring camera, and the third digital proctoring camera is connected to the router.

In yet another aspect, at least one of the first digital proctoring camera, the second digital proctoring camera, and the third digital proctoring camera is connected to the router using a Universal Serial Bus (USB) protocol.

In yet another aspect, at least one of the first digital proctoring camera, the second digital proctoring camera, and the third digital proctoring camera is connected to the router using a Bluetooth protocol.

In yet another aspect, at least one of the first digital proctoring camera, the second digital proctoring camera, and the third digital proctoring camera is connected to the router using a Wi-Fi protocol.

In yet another aspect, at least one of the first digital proctoring camera, the second digital proctoring camera, and the third digital proctoring camera is supported by a stand.

In yet another aspect, at least one of the first digital proctoring camera, the second digital proctoring camera, and the third digital proctoring camera is supported by a stand, wherein the stand is secured to a desktop of the desk supporting the examinee's computer.

In yet another aspect, at least one of the first digital proctoring camera, the second digital proctoring camera, and the third digital proctoring camera is supported by a stand, wherein the stand is secured to a desktop of the desk supporting the examinee's computer using a clamping system.

In yet another aspect, at least one of the first digital proctoring camera, the second digital proctoring camera, and the third digital proctoring camera is supported by a stand, wherein the stand is secured to a desktop of the desk supporting the examinee's computer using a suction cup arrangement.

In yet another aspect, at least one of the first digital proctoring camera, the second digital proctoring camera, and the third digital proctoring camera further comprising at least one motion sensor.

In yet another aspect, at least one of the first digital proctoring camera, the second digital proctoring camera, and the third digital proctoring camera further comprising at least one motion sensor, wherein the motion sensor identifies when the at least one of the first digital proctoring camera, the second digital proctoring camera, and the third digital proctoring camera is moved.

In yet another aspect, at least one of the first digital proctoring camera, the second digital proctoring camera, and the third digital proctoring camera further comprising at least one motion sensor, wherein the motion sensor identifies when an object in a proximity of the camera moves.

In yet another aspect, at least one of the first digital proctoring camera, the second digital proctoring camera, and the third digital proctoring camera further comprising at least one motion sensor, wherein the motion sensor identifies when an object other than the examinee in a proximity of the camera moves.

In yet another aspect, the system further comprising at least one microphone.

In yet another aspect, the router is connected to the Internet.

In yet another aspect, the system further comprising reference markers to aid in identifying a viewing boundary of at least one digital proctoring camera.

In yet another aspect, the reference markers are placed upon at least two corners of the examinee's monitor.

In yet another aspect, the reference markers are placed upon at least two corners of the examinee's monitor, wherein the at least two corners includes upper corners of the examinee's monitor.

In yet another aspect, the reference markers are placed upon at least two corners of the examinee's keyboard.

In yet another aspect, the reference markers are placed upon at least two corners of the examinee's keyboard, wherein the at least two corners includes proximal corners of the examinee's keyboard.

In yet another aspect, the reference markers are placed upon at least two corners of the examinee's keyboard, wherein the at least two corners includes distal corners of the examinee's keyboard.

In yet another aspect, at least one digital proctoring camera is oriented to obtain video of a pointing device used in conjunction with the Examinee's computer.

In yet another aspect, at least one digital proctoring camera is oriented to obtain video of the pointing device used in conjunction with the Examinee's computer, wherein the pointing device is a mouse.

In yet another aspect, at least one digital proctoring camera is oriented to obtain video of the pointing device used in conjunction with the Examinee's computer, wherein the pointing device is a trackball.

In yet another aspect, at least one digital proctoring camera is oriented to obtain video of the pointing device used in conjunction with the Examinee's computer, wherein the pointing device is a track pad.

In yet another aspect, at least one digital proctoring camera is oriented to obtain video of a pen tablet.

In yet another aspect, at least one digital proctoring camera is oriented to obtain video of a pen tablet, wherein the pen tablet includes a touch pen and an input contact pad.

In yet another aspect, at least one digital proctoring camera is oriented to obtain video of a pen tablet, wherein the pen tablet includes a touch pen and an input contact pad, the touch pen being tethered to the contact pad.

In yet another aspect, the proctoring software includes a function to record keystrokes of the keyboard associated with the examinee's computer.

In yet another aspect, the proctoring software includes a function to timestamp and record keystrokes of the keyboard associated with the examinee's computer.

In yet another aspect, the proctoring software includes a function to display a reference time on the monitor, wherein the reference time is synchronized with video recorded by at least one of the digital proctoring cameras.

In yet another aspect, the proctoring software includes a function to display a reference time on the monitor, wherein the reference time is synchronized with video recorded by each of the digital proctoring cameras.

In yet another aspect, the proctoring software includes a function to compare entries displayed on the monitor with the keystrokes made by the examinee.

In yet another aspect, the proctoring software includes a function to compare entries displayed on the monitor with the keystrokes made by the examinee, wherein the keystrokes are determined by computer software and the entries displayed upon the monitor are determined using captured digital video and optical character recognition (OCR) software.

In yet another aspect, the proctoring software includes a function to compare the displayed reference time on the monitor with the timestamp of the keystrokes made by the examinee.

In yet another aspect, the proctoring software includes a function to identify articles located on a desktop of the desk supporting the examinee's computer.

In yet another aspect, the proctoring software includes a function to identify when at least one hand of an examinee is moved away from the keyboard associated with the examinee's computer.

In yet another aspect, a testing station used by the examinee is located against at least one wall.

In yet another aspect, a test to be taken is obtained from a testing computer.

In yet another aspect, a test to be taken is obtained from a testing computer, wherein the testing computer is in digital communication with a network.

In yet another aspect, a test to be taken is obtained from a testing computer, wherein the testing computer is in digital communication with a network, wherein the network is an Internet.

In yet another aspect, each test obtained from a testing computer is identified and associated with the respective examinee.

In yet another aspect, each test obtained from a testing computer is identified and associated with the respective examinee, wherein the association and respective information is recorded.

In yet another aspect, each test obtained from a testing computer is identified and associated with the respective examinee, wherein the association and respective information is recorded on the testing computer.

In yet another aspect, each test obtained from a testing computer is identified and associated with the respective examinee, wherein the association and respective information is recorded on a proctoring computer.

In yet another aspect, a test to be taken is obtained from a testing computer, wherein the proctoring computer is in digital communication with a network.

In yet another aspect, a test to be taken is obtained from a testing computer, wherein the proctoring computer is in digital communication with a network, wherein the network is an Internet.

In yet another aspect, proctoring software is obtained from the proctoring computer.

In yet another aspect, proctoring software operates remotely from the proctoring computer.

In yet another aspect, the network is a private network.

In yet another aspect, the network is a secure, private network.

In yet another aspect, the network is a public network.

In yet another aspect, the network includes the Internet.

In yet another aspect, proctoring is accomplished by monitoring video provided by each of the digital proctoring cameras arranged to monitor each examinee.

In yet another aspect, proctoring is accomplished by monitoring video provided by each of the digital proctoring cameras arranged to monitor each examinee, wherein the video associated with each examinee is presented as a cluster.

In yet another aspect, the proctoring system further comprising artificial intelligence software.

In yet another aspect, the proctoring system further comprising a privacy filter.

In yet another aspect, the proctoring system further comprising a privacy filter, wherein the privacy filter reduces a viewing angle of the monitor used in conjunction with the examinee's computer.

In yet another aspect, the proctoring system further comprising a privacy filter, wherein the privacy filter is sized to be temporarily secured to the monitor used in conjunction with the examinee's computer.

In yet another aspect, the privacy filter is secured to the monitor using a strap.

In yet another aspect, the privacy filter is secured to the monitor using an elastic strap.

In yet another aspect, the privacy filter is secured to the monitor using a clamp.

In yet another aspect, the privacy filter is secured to the monitor using an adhesive.

In yet another aspect, the present invention discloses a method of use for proctoring a testing process, wherein the test is taken in an examinee's computer, the method comprising steps of:

obtaining a test proctoring kit, the test proctoring kit comprising:
  a first digital proctoring camera arranged to have digital communication with to a proctor monitoring system, and
  a second digital proctoring camera arranged to have digital communication with to the proctor monitoring system;

arranging the first digital proctoring camera in an orientation to capture video of the examinee's keyboard and a portion of the examinee, including the examinee's hands and face;

arranging the second digital proctoring camera in an orientation to capture video of a monitor screen of the examinee's computer and at least a portion of a desk supporting the examinee's computer;

accessing proctoring software; and initiating proctoring software.

In yet another aspect, the present invention discloses a system used during administration of a test, the system comprising:
- a proctoring software operating on microprocessor of a proctoring server;
- at least one of: (a) a wired and (b) a wireless communication device providing a communication link between the proctoring server and a test administering computing device;
- a proctoring application installed on at least one portable computing/communicating device;
- the proctoring application comprising steps of:
  - identifying each of the at least one portable computing/communicating device located within a test administration area,
  - monitoring activity of each of the at least one portable computing/communicating device located within a test administration area; and
- the proctoring software comprising steps of:
  - accessing the monitored activity of each of the at least one portable computing/communicating device located within the test administration area,
  - reviewing the monitored activity of each at least one portable computing/communicating device located within the test administration area to determine if any potentially illicit activity has occurred on any of the at least one portable computing/communicating device located within the test administration area,
  - identifying any potentially illicit activity on the recorded activity of each at least one portable computing/communicating device located within the test administration area, and
  - reporting the identified potentially illicit activity on the recorded activity of each at least one portable computing/communicating device located within the test administration area.

In yet another aspect, the system further comprising steps of:
- identifying a start time of the examination period, and
- initiating a proctoring portion of the proctoring application at the start time of the examination period.

In yet another aspect, the system further comprising steps of:
- identifying a termination time of the examination period, and
- terminating the proctoring portion of the proctoring application at the termination time of the examination period.

In yet another aspect, the system further comprising a step of recording the activity of one or more of the at least one portable computing/communicating device located within a test administration area.

In yet another aspect, the step of recording the activity of one or more of the at least one portable computing/communicating device located within a test administration area is accomplished by a screen image recording function of the respective portable computing/communicating device.

In yet another aspect, the step of recording the activity of the one or more of the at least one portable computing/communicating device located within a test administration area only occurs when the respective portable computing/communicating device is unlocked and pauses when the respective portable computing/communicating device is locked.

In yet another aspect, the recorded activity of the one or more of the at least one portable computing/communicating device located within the test administration area is a video recording of information displayed upon a display of the respective portable computing/communicating device.

In yet another aspect, the step of recording the activity of the one or more of the at least one portable computing/communicating device located within a test administration area only occurs when the respective portable computing/communicating device is unlocked and pauses when the respective portable computing/communicating device is locked.

In yet another aspect, the recorded activity of the one or more of the at least one portable computing/communicating device located within the test administration area is a video recording of information displayed upon a display of the respective portable computing/communicating device, wherein the recording is acquired using a video recorder that is independent from the respective portable computing/communicating device.

In yet another aspect, the step of identifying each of the at least one portable computing/communicating device located within a test administration area is accomplished by at least one of:
- a) using a thermal sensor to identify powered on electronic devices,
- b) using a Radio Frequency (RF) detection device to identify RF signals emitted from the at least one portable computing/communicating device,
- c) using a device name integrated into a wireless transmission protocol packet,
- d) using an Internet Protocol (IP) address identified by a router,
- e) using a media access control address (MAC address) identified by a router,
- f) using a Global Positioning System receiving integrated into one or more of the at least one portable computing/communicating device,
- g) using a reporting function of the proctoring application installed on one or more of the at least one portable computing/communicating device, and
- h) using at least one camera to acquire at least one image of the test administration area.

In yet another aspect, the system further comprising a step of acquiring at least one of an image and video of a screen of one or more of the at least one portable computing/communicating device, wherein an image displayed upon the screen includes at least one of:
- a) device information associated with the respective portable computing/communicating device,
- b) a serial number of the device,
- c) a model of the device,
- d) a version of operating software of the device,
- e) an International Mobile Equipment Identity (IMEI) of the device,
- f) a telephone number assigned to the device,
- g) an Internet Protocol (IP) address assigned to the respective portable computing/communicating device, and
- h) a media access control address (MAC address) assigned to the respective portable computing/communicating device.

In yet another aspect, the system further comprising a step of restricting communication on the one or more of the at least one portable computing/communicating device, wherein the step of restricting communication includes at least one of:
- a) deactivating wireless functions,
- b) deactivating a cellular function, c) limiting communication to the cellular function,
d) deactivating a Voice Over Internet Protocol (VOIP) communication function,
e) limiting communication to the Voice Over Internet Protocol (VOIP) communication,
f) limiting communication to incoming telephone calls,
g) limiting communication to one or more messaging applications,
h) limiting communication to incoming messages using one or more of the messaging applications,
i) limiting communication to text messages,
j) limiting communication to incoming text messages,
k) limiting communication to email messages, and
l) limiting communication to incoming email messages, In yet another aspect, the method further comprises a step of verifying the arrangement of the first digital proctoring camera with a proctor and verifying the arrangement of the second digital proctoring camera with the proctor.

In yet another aspect, the method further comprises a step of adjusting an arrangement of at least one of the arrangement of the first digital proctoring camera and the arrangement of the second digital proctoring camera when instructed by the proctor.

In yet another aspect, wherein the step of arranging the first digital proctoring camera in an orientation to capture video of the examinee's keyboard and a portion of the examinee, including at least one of an examinee's hands and an examinee's face arranges the first digital proctoring camera in the orientation to capture video of the examinee's keyboard and the portion of the examinee, including each of the examinee's hands and the examinee's face.

In yet another aspect, further comprising a step of arranging a third digital proctoring camera in an orientation to capture video of the monitor screen of the examinee's computer and at least a portion of the desk supporting the examinee's computer,
   wherein the second digital proctoring camera is arranged to capture video using a first viewing angle,
   wherein the third digital proctoring camera is arranged to capture video using a second viewing angle,
   wherein the first viewing angle and the second viewing angle differ from one another.

In yet another aspect, further comprising a step of utilizing artificial intelligence by a processor of the proctor monitor system to identify improprieties during administration of an exam.

In yet another aspect, further comprising a step of distributing an exam from an examination computer to each examinee's computer via a commonly accessible network.

In yet another aspect, wherein a privacy filter screen is placed over a display of the examinee's computer, the method further comprising a step of distributing an exam from an examination computer to each examinee's computer via a commonly accessible network.

In yet another aspect, the method further comprises a step of scanning or digitizing all papers the examinee intends to use during the process of taking the test, then providing a copy of the digital images of all papers to the proctor.

In yet another aspect, the method further comprises a step of presenting each electronic device to the proctor.

In yet another aspect, the method further comprises a step of powering on then presenting each electronic device to the proctor.

In yet another aspect, wherein the step of step of presenting each electronic device to the proctor includes a step of presenting a Smartphone to the proctor.

In yet another aspect, wherein the step of step of presenting each electronic device to the proctor includes a step of confirming that the Smartphone presented to the proctor is the Examinee's Smartphone.

In yet another aspect, wherein the step of step of presenting each electronic device to the proctor includes a step of confirming that the Smartphone presented to the proctor is the examinee's Smartphone, wherein the step is accomplished by sending a message directly to the examinee's Smartphone and the examinee presenting the message to the proctor.

In yet another aspect, wherein the step of step of presenting each electronic device to the proctor includes a step of confirming that the Smartphone presented to the proctor is the examinee's Smartphone, wherein the step is accomplished by sending a text message directly to the examinee's Smartphone and the examinee presenting the text message to the proctor.

In yet another aspect, wherein the step of step of presenting each electronic device to the proctor includes a step of confirming that the Smartphone presented to the proctor is the examinee's Smartphone, wherein the step is accomplished by sending a push message directly to the examinee's Smartphone and the examinee presenting the push message to the proctor.

In yet another aspect, wherein the step of step of presenting each electronic device to the proctor includes a step of confirming that the Smartphone presented to the proctor is the examinee's Smartphone, wherein the step is accomplished by sending an email message directly to the examinee's Smartphone and the examinee presenting the email message to the proctor.

In yet another aspect, wherein the step of step of presenting each electronic device to the proctor includes a step of presenting a calculator to the proctor.

In yet another aspect, the method further comprises a step of accessing a subject test.

In yet another aspect, the method further comprises a step of downloading the accessed subject test.

In yet another aspect, the method further comprises a step of administering the downloaded subject test.

In yet another aspect, the method further comprises a step of taking the downloaded subject test.

In yet another aspect, the method further comprises a step of accessing the subject test via a website.

In yet another aspect, the method further comprises a step of administering the subject test via a website.

In yet another aspect, the method further comprises a step of taking the subject test via a website.

In yet another aspect, the method further comprises a step of monitoring the administration of the test by the proctor.

In yet another aspect, the method further comprises a step of acquiring video of the computer display during the test administration period.

In yet another aspect, the method further comprises a step of acquiring video of each computer display during the test administration period.

In yet another aspect, the method further comprises a step of acquiring video of each computer display of multiple computer displays during the test administration period.

In yet another aspect, the method further comprises a step of acquiring video of the environment surrounding the test administration station during the test administration period.

In yet another aspect, the method further comprises a step of acquiring video of the desktop of the test administration station during the test administration period.

In yet another aspect, the method further comprises a step of acquiring video of the examinee's hands during the test administration period.

In yet another aspect, the method further comprises a step of acquiring video of the examinee's face during the test administration period.

In yet another aspect, the method further comprises a step of acquiring video of the examinee's eyes during the test administration period.

In yet another aspect, the method further comprises a step of monitoring the administration of the test using artificial intelligence.

In yet another aspect, the method further comprises a step of monitoring the administration of the test using artificial intelligence, wherein the artificial intelligence is programmed to determine anomalies during the test taking process.

In yet another aspect, wherein the step of determining anomalies during the test taking process includes at least one of:
- use of an electronic device that differs from those previously presented to the proctor,
- use of a paper that differs from those previously presented to the proctor,
- movement of the examinee away from a station where the test is being administered,
- movement of one or more of the digital proctoring cameras,
- a condition where the keystrokes and the display on the monitor are not synchronized,
- recognition of any other individuals in an area of the station where the test is being administered,
- recognition of a sound in the area of the station where the test is being administered, wherein the sound is an anomaly from sounds associated with a taking of a test on a computer, and
- recognition when a time displayed on the monitor of the examinee's computer differs from a time at the proctoring station.

In yet another aspect, the method further comprises a step of monitoring the administration of the test using a combination of the proctor and artificial intelligence.

In yet another aspect, the method further comprises a step of taking the administered test.

In yet another aspect, wherein the step of taking the administered test is accomplished by responding to instructions provided by the test.

In yet another aspect, wherein the step of taking the administered test is accomplished by answering questions presented by the test.

In yet another aspect, wherein the step of taking the administered test is accomplished by answering multiple choice questions presented by the test.

In yet another aspect, wherein the step of taking the administered test is accomplished by answering fill in the blank questions presented by the test.

In yet another aspect, wherein the step of taking the administered test is accomplished by answering essay questions presented by the test.

In yet another aspect, wherein the step of taking the administered test is accomplished by answering math questions presented by the test.

In yet another aspect, wherein the step of taking the administered test is accomplished by answering math questions presented by the test using the pen tablet to execute and document mathematical steps used to determine an answer to one or more math questions.

In yet another aspect, the method further comprises a step of notifying the proctor that the examinee has completed the administered test.

In yet another aspect, the method further comprises a step of scanning or digitizing all papers the examinee used or had access to during the process of taking the test, then providing a copy of the digital images of all papers to the proctor, wherein this step is accomplished after completion of the test.

In yet another aspect, the method further comprises a step of recording all video captured during the administration of the test.

In yet another aspect, the method further comprises a step of recording the display presented on the monitor during the administration of the test.

In yet another aspect, the method further comprises a step of recording the keystrokes applied during the administration of the test.

In yet another aspect, the method further comprises a step of recording all movements associated with each pointer device during the administration of the test.

In yet another aspect, the proctoring system can further comprise at least one of:
a. a wide angle lens camera, preferably being mountable to a top edge of the monitor,
b. an infrared camera, preferably being mountable to a top edge of the monitor, and
c. a camera arrangement enabling extraction of personal area images from the proctoring viewing area.

In yet another aspect, the proctoring system can employ the wide angle lens camera to enable image acquisition of a broader area of the examination location.

In yet another aspect, the proctoring system can employ the wide angle lens camera to enable image acquisition of a broader area of the examination location, including at least one of: the user's hands, the examination keyboard, the examinee's face, the examination desk, and the like.

In yet another aspect, the proctoring system can employ the wide angle lens camera to enable image acquisition of a broader area of the examination location, including two or more of: the user's hands, the examination keyboard, the examinee's face, the examination desk, and the like.

In yet another aspect, the proctoring system can employ the wide angle lens camera to enable image acquisition of a broader area of the examination location, including: the user's hands, the examination keyboard, the examinee's face, the examination desk, and the like.

In yet another aspect, the proctoring system can employ a remotely moveable camera to enable image acquisition of a broader area of the examination location.

In yet another aspect, the proctoring system can employ a remotely moveable camera to enable image acquisition of a broader area of the examination location, wherein the positioning of the camera is operated by the proctor.

In yet another aspect, the proctoring system can employ a remotely moveable camera to enable image acquisition of a broader area of the examination location, wherein the positioning of the camera is operated by the proctoring system software.

In yet another aspect, the proctoring system can employ a remotely moveable camera to enable image acquisition of a broader area of the examination location, wherein the positioning of the camera is operated by at least one of the proctor and the proctoring system software.

In yet another aspect, the proctoring system can employ the infrared camera to determine if another person is within the testing area.

In yet another aspect, the proctoring system can employ the infrared camera to determine if a second person is within the testing area without invading the privacy of the second person.

In yet another aspect, the infrared camera is preferably capable of acquiring images in at least a 90 degree view.

In yet another aspect, the infrared camera is preferably capable of acquiring images in at least a 180 degree view.

In yet another aspect, the infrared camera is preferably capable of acquiring images in at least a panoramic or 360 degree view.

In yet another aspect, the proctoring system can employ the infrared camera to determine if a second person is within the testing area without invading the privacy of the examinee or the second person.

In yet another aspect, the proctoring system can employ a camera comprising a wide angle lens and an infrared 360 degree image acquisition system.

In yet another aspect, the proctoring system can include software including an instruction set for removing unnecessary background portions of acquired images or video.

In yet another aspect, the proctoring system can include software including an instruction set for digitally removing unnecessary background portions of acquired images or video.

In yet another aspect, the proctoring system can employ a motion sensing device to determine if a second person is within the testing area.

In yet another aspect, the motion sensing device to determine if a second person is within the testing area.

In yet another aspect, the motion sensing device would be employed to determine if a second person is within the testing area without invading the privacy of the second person.

In yet another aspect, the motion sensing device is preferably capable of monitoring for a motion exclusive of a blocked out region surrounding the examinee.

In yet another aspect, the motion sensing device is preferably capable of monitoring for a motion in at least a 90 degree view.

In yet another aspect, the motion sensing device is preferably capable of monitoring for a motion in at least a 90 degree view exclusive of the blocked out region surrounding the examinee.

In yet another aspect, the motion sensing device is preferably capable of monitoring for a motion in at least a 180 degree view.

In yet another aspect, the motion sensing device is preferably capable of monitoring for a motion in at least a 180 degree view exclusive of the blocked out region surrounding the examinee.

In yet another aspect, the motion sensing device is preferably capable of monitoring for a motion in at least a 360 degree view.

In yet another aspect, the motion sensing device is preferably capable of monitoring for a motion in at least a 360 degree view exclusive of the blocked out region surrounding the examinee.

In yet another aspect, the proctoring system can include software including an instruction set for removing unnecessary background portions of acquired images or video wherein the background portions are determined by images acquired using different lenses set at different focal distances.

In yet another aspect, the proctoring system can include software including an instruction set for digitally removing unnecessary background portions of acquired images or video, wherein the unnecessary background portions of acquired images or video are removed prior to viewing by a proctoring agent.

In yet another aspect, the method further comprises a step of installing a privacy screen.

In yet another aspect, the method further comprises a step of installing a privacy screen, wherein the privacy screen reducing a viewing angle of the display of the monitor.

In yet another aspect, the method further comprises a step of installing a privacy screen, wherein the step of installing the privacy screen is accomplished by securing the privacy screen to the monitor.

In yet another aspect, the method further comprises a step of installing a privacy screen, wherein the step of installing the privacy screen is accomplished by securing the privacy screen to the monitor using a strap.

In yet another aspect, the method further comprises a step of installing a privacy screen, wherein the step of installing the privacy screen is accomplished by securing the privacy screen to the monitor using an elastic strap.

In yet another aspect, the method further comprises a step of installing a privacy screen, wherein the step of installing the privacy screen is accomplished by securing the privacy screen to the monitor using a clamp.

In yet another aspect, the method further comprises a step of installing a privacy screen, wherein the step of installing the privacy screen is accomplished by securing the privacy screen to the monitor using an adhesive.

In yet another aspect, the method further comprises a step of installing a privacy screen, wherein the step of installing the privacy screen is accomplished by securing the privacy screen to the monitor using a double sided tape.

In yet another aspect, the method further comprises a step of applying reference markers to the display side of the monitor.

In yet another aspect, the method further comprises a step of applying reference markers to each of a right side of the display side of the monitor and a left side of the display side of the monitor.

In yet another aspect, the method further comprises a step of applying reference markers to each of a right upper corner of the display side of the monitor and a left upper corner of the display side of the monitor.

In yet another aspect, the method further comprises a step of applying reference markers to each of a right lower corner of the display side of the monitor and a left lower corner of the display side of the monitor.

In yet another aspect, the method further comprises a step of applying reference markers to each of a right side of the keyboard and a left side of the keyboard.

In yet another aspect, the method further comprises a step of applying reference markers to each of a right front corner of the keyboard and a left front corner of the keyboard.

In yet another aspect, the method further comprises a step of applying reference markers to each of a right rear corner of the keyboard and a left rear corner of the keyboard.

In yet another aspect, the method further comprises a step of applying reference markers to each of a right side of the desktop and a left side of the desktop.

In yet another aspect, the method further comprises a step of applying reference markers to each of a right front corner of the desktop and a left front corner of the desktop.

In yet another aspect, the method further comprises a step of applying reference markers to each of a right rear corner of the desktop and a left rear corner of the desktop.

In yet another aspect, the method further comprises a step of utilizing the reference markers to confirm that a viewing area of the digital proctoring camera is capturing images covering the minimum desired area.

In yet another aspect, the method further comprises a step of displaying video from each digital proctoring camera of at least one examinee on a proctoring monitor.

In yet another aspect, the method further comprises a step of displaying video from each digital proctoring camera of multiple examinees on the proctoring monitor.

In yet another aspect, the method further comprises a step of displaying video from each digital proctoring camera of at least one examinee and displaying an identification of the examinee at a location proximate the displayed video on the proctoring monitor.

In yet another aspect, the method further comprises a step of displaying video from each digital proctoring camera of multiple examinees in clusters and displaying an identification of each examinee at a location proximate each respective displayed video cluster on the proctoring monitor.

In yet another aspect, the method further comprises a step of displaying video from each digital proctoring camera of at least one examinee in a cluster and displaying the identification of the examinee at the location proximate the displayed video on the proctoring monitor.

In yet another aspect, the method further comprises a step of monitoring at least one examinee by watching video images captured by the digital proctoring cameras, the video images being displayed on a proctoring monitor on the proctoring monitor.

In yet another aspect, the method further comprises a step of presenting an alert to the proctor when the proctoring software determines an anomaly has occurred.

In yet another aspect, the method further comprises a step of presenting an alert to the proctor when the proctoring software determines an anomaly has occurred, wherein the alert is a visual alert.

In yet another aspect, the method further comprises a step of presenting an alert to the proctor when the proctoring software determines an anomaly has occurred, wherein the alert is a visual alert displayed on the proctoring monitor.

In yet another aspect, the method further comprises a step of presenting an alert to the proctor when the proctoring software determines an anomaly has occurred, wherein the alert is an audible alert.

In yet another aspect, the method further comprises a step of rewinding at least one video to determine appropriateness of actions of the examinee.

In yet another aspect, the method further comprises a step of rewinding at least one video to review the anomaly.

In yet another aspect, the method includes a process of authenticating the examinee.

In yet another aspect, the method includes a process of authenticating the examinee using at least one biometric.

In yet another aspect, the method includes a process of authenticating the examinee using at least one biometric, wherein the Examinee can select at least one biometric from a group of biometrics.

In yet another aspect, the method includes a process of authenticating the examinee using at least one biometric, wherein the Examinee can select at least one biometric from a group of biometrics, wherein the group of biometrics includes fingerprint authentication, facial recognition, retina scan, voice recognition, or any other suitable biometric identification process.

In yet another aspect, the method includes a process of authenticating the examinee using at least one biometric, wherein the at least one biometric is acquired using at least one of a camera, a scanner, and a microphone.

In yet another aspect, the method includes a process of authenticating the examinee using at least one biometric, wherein the at least one biometric is acquired by the test administrating computing device.

In yet another aspect, the method includes a process of authenticating the examinee using at least one biometric, wherein the at least one biometric is acquired by the test administrating computing device using at least one of a camera, a scanner, and a microphone in communication with the test administrating computing device.

In yet another aspect, the method includes a process of authenticating the examinee using at least one biometric, wherein the at least one biometric is acquired by a portable computing device.

In yet another aspect, the method includes a process of authenticating the examinee using at least one biometric, wherein the at least one biometric is acquired by the portable computing device using at least one of a camera, a scanner, and a microphone in communication with the portable computing device.

In yet another aspect, the method includes a process of authenticating the examinee using at least one biometric, wherein the at least one biometric is acquired by an electronic communication device.

In yet another aspect, the method includes a process of authenticating the examinee using at least one biometric, wherein the at least one biometric is acquired by the electronic communication device using at least one of a camera, a scanner, and a microphone in communication with the electronic communication device.

In yet another aspect, wherein the electronic communication device is at least one of: a walkie-talkie, a paging device, an alpha-numeric paging device, a cellular telephone, a portable computing tablet, a laptop computer, or any other suitable electronic communication device.

In yet another aspect, the method includes a process of authenticating the examinee using at least one biometric, wherein the examinee would provide a biometric identifier at a time of initial registration.

In yet another aspect, the method includes a process of authenticating the examinee using at least one biometric, wherein the examinee would provide a biometric identifier at a time of initial registration and provide a second biometric identifier at a time immediately prior to administering the test.

In yet another aspect, the method additionally includes a process of determining a location of the acquisition of the authenticating biometric identifier provided at the time of registration.

In yet another aspect, the method additionally includes a process of determining a location of the acquisition of the second biometric identifier at a time immediately prior to administering the test.

In yet another aspect, the method includes a process for verifying a location of the test administering computer.

In yet another aspect, the method includes a process for verifying a location of the test administering computer using at least one of: an Internet Protocol (IP) address assigned to the test administering computer, a media access control address (MAC address) assigned to the test administering computer, a global Positioning system at least partially operated by the test administering computer, a visual validation of the location of the test administering computer, a visual validation of the location of the test administering computer wherein the visual validation is acquired by a camera in a known location, a process of transmitting an image to the test administering computer and verifying the displayed image using a camera in a known location, acquiring an image using a camera operated by the test administering computer, wherein the image acquisition process includes metadata identifying the location of the test administering computer, acquiring an image using a camera operated by the test administering computer, wherein the image acquisition process includes metadata identifying the location of the test administering computer and forwarding the acquired image and associated metadata to the testing proctor, or any other known method of determining a location of a computing device.

In yet another aspect, the method includes a step of identifying all of one or more communication devices associated with the examinee.

In yet another aspect, the method includes a step of identifying all of one or more communication devices carried by the examinee.

In yet another aspect, the method includes a step of documenting all of the one or more communication devices associated by the examinee.

In yet another aspect, the method includes a step of applying operating restrictions to one or more communication devices associated with the examinee.

In yet another aspect, the method includes a step of installing a proctoring application on each of the one or more communication devices associated with the examinee.

In yet another aspect, the method includes a step of activating the proctoring application on each of the one or more communication devices associated with the examinee.

In yet another aspect, the method includes a step of verifying that the proctoring application is activate on each of the one or more communication devices associated with the examinee.

In yet another aspect, the method includes a step of verifying that the proctoring application is activate on each of the one or more communication devices associated with the examinee that are powered on.

In yet another aspect, the method includes a step of verifying that the proctoring application is activate on each of the one or more communication devices associated with the examinee that are powered on by pinging each of the one or more communication devices associated with the examinee and obtaining a response.

In yet another aspect, the method includes a step of verifying that the proctoring application is activate on each of the one or more communication devices associated with the examinee that are powered on by pinging each of the one or more communication devices associated with the examinee via the proctoring application and obtaining a response.

In yet another aspect, wherein the proctoring application provides a status of the device to a test administering proctor.

In yet another aspect, wherein the proctoring application provides a status of the device to a test administering proctor; more specifically, a repeating signal identifying when the device hosting the proctoring application is powered on.

In yet another aspect, wherein the proctoring application provides a status of the device to a test administering proctor; more specifically, a repeating signal identifying when the device hosting the proctoring application is powered on, wherein a lack of a signal identifies when the device hosting the proctoring application is powered off.

In yet another aspect, wherein the proctoring application deactivates wireless functions of the device hosting the proctoring application.

In yet another aspect, wherein the proctoring application deactivates wireless functions of the device hosting the proctoring application, wherein the proctoring application provides a status of the device to a test administering proctor; more specifically, a repeating signal identifying when the device hosting the proctoring application is powered on, wherein a lack of a signal identifies when the wireless functions of the device hosting the proctoring application are deactivated.

In yet another aspect, wherein the proctoring application limits the cellular communication circuit of the device hosting the proctoring application.

In yet another aspect, wherein the proctoring application limits the cellular communication circuit of the device hosting the proctoring application, wherein the cellular communication circuit only allows incoming calls.

In yet another aspect, wherein the proctoring application limits the cellular communication circuit of the device hosting the proctoring application, wherein the cellular communication circuit only allows incoming calls from a limited number of telephone numbers.

In yet another aspect, wherein the proctoring application limits the cellular communication circuit of the device hosting the proctoring application, wherein the cellular communication circuit only allows incoming calls from a limited number of telephone numbers, wherein the allowed telephone numbers are limited to telephone numbers included in a contact list established on the cellular device.

In yet another aspect, wherein the proctoring application limits the cellular communication circuit of the device hosting the proctoring application, wherein the cellular communication circuit only allows incoming calls from a limited number of telephone numbers, wherein the allowed telephone numbers are limited to telephone numbers included in a favorites portion of the contact list established on the cellular device.

In yet another aspect, wherein the proctoring application limits communications of the device hosting the proctoring application to text messages.

In yet another aspect, wherein the proctoring application restricts receipt of any text messages by the device hosting the proctoring application.

In yet another aspect, wherein the proctoring application restricts receipt of any text messages by the device hosting the proctoring application during the testing period.

In yet another aspect, wherein the proctoring application restricts transmitting of any text messages by the device hosting the proctoring application.

In yet another aspect, wherein the proctoring application restricts transmitting of any text messages by the device hosting the proctoring application during the testing period.

In yet another aspect, wherein the proctoring application restricts receipt of any emails.

In yet another aspect, wherein the proctoring application restricts receipt of any emails during the testing period.

In yet another aspect, wherein the proctoring application restricts sending of any emails.

In yet another aspect, wherein the proctoring application restricts sending of any emails during the testing period.

In yet another aspect, wherein the proctoring application restricts receipt of any messages using any messaging applications.

In yet another aspect, wherein the proctoring application restricts receipt of any messages using any messaging applications during the testing period.

In yet another aspect, wherein the proctoring application restricts sending of any messages using any messaging applications.

In yet another aspect, wherein the proctoring application restricts sending of any messages using any messaging applications during the testing period.

In yet another aspect, wherein the messages can include text, images, photographs, videos, emoji's, memes, audio files, and the like.

In yet another aspect, wherein the proctoring application restricts activation of any other Applications while active.

In yet another aspect, wherein the proctoring application restricts activation of any other Applications over a test administration period.

In yet another aspect, wherein the proctoring application restricts activation of any other Applications over a test administration period, wherein the test administration period is a predetermined period of time.

In yet another aspect, wherein the proctoring application restricts activation of any other Applications over a test administration period, wherein the test administration period is governed by the test administering proctor.

In yet another aspect, wherein the proctoring application restricts activation of any other Applications until the test administering proctor provides the proctoring application with an instruction confirming completion of the segment of testing.

In yet another aspect, the method includes a process for detecting any active radio frequency devices.

In yet another aspect, the method includes a process for detecting any active radio frequency devices by detecting any active radio frequency signals.

In yet another aspect, the method includes a process for detecting any active radio frequency devices by detecting any active radio frequency signals using a radio detection device.

In yet another aspect, the method includes a process for detecting any active radio frequency devices by detecting any active radio frequency signals using a router.

In yet another aspect, the method includes a process for detecting any active radio frequency devices by detecting any active radio frequency signals using a router to detect any of: a Wi-Fi transmission, a Bluetooth transmission, a Near Field Communication (NFC) transmission, or any other commonly used wireless transceiving protocol.

In yet another aspect, the method includes a process for detecting any active radio frequency devices by detecting any active radio frequency signals using a router to detect any of: a Wi-Fi transmission, a Bluetooth transmission, a Near Field Communication (NFC) transmission, or any other commonly used wireless transceiving protocol, and further comprising a step of identifying a device by a device name or identifier included in the protocol transmission.

In yet another aspect, the method includes a process of recoding all wireless transmissions within the test administering facility.

In yet another aspect, the method includes a process for detecting all electrically operated devices by using at least one thermal imaging camera.

In yet another aspect, the method includes a process for detecting all electrically operated devices by using at least one thermal imaging camera, wherein the thermal imaging camera would be provided to the Examinee by at least one of the test administrating company and the proctoring company.

In yet another aspect, the method includes a process for detecting all electrically operated devices by using at least one thermal imaging camera, wherein the location of the at least one thermal imaging camera is determined and automatically provided to the testing proctor.

In yet another aspect, the method includes a process for detecting all electrically operated devices by using at least one thermal imaging camera, wherein the location of the at least one thermal imaging camera is determined and automatically provided to the testing proctor, the thermal imaging camera may include a step of acquiring a thermal image of the test administering computer to aid in verification of the installation thereof in the test administering location.

In yet another aspect, the method includes a process of recoding a screen of each device hosting the proctoring application.

In yet another aspect, the method includes a process of recoding a screen of each device hosting the proctoring application during the entire test administration time period.

In yet another aspect, the method includes a process of recoding a display on a screen of each device hosting the proctoring application, wherein activity displayed on the screen is recorded while the hosting device is active (unlocked) and pauses recording while the hosting device is locked.

In yet another aspect, the recoding of the display on the screen of each device hosting the proctoring application is accessible by the proctoring party (person, system, etc.).

In yet another aspect, the recoding of the display on the screen of each device hosting the proctoring application is forwarded to the proctoring party (person, system, etc.).

In yet another aspect, the recoding of the display on the screen of each device hosting the proctoring application is secure.

In yet another aspect, the recoding of the display on the screen of each device hosting the proctoring application is encrypted.

In yet another aspect, the recoding of the display on the screen of each device hosting the proctoring application is analyzed to identify when a suspicious activity on the communication device occurs.

In yet another aspect, the recoding of the display on the screen of each device hosting the proctoring application is analyzed to identify when a message is received on the communication device.

In yet another aspect, the recoding of the display on the screen of each device hosting the proctoring application is analyzed to identify when a message is received on the communication device, wherein the message is a text message, an email, an application message, an audio message, a video message, or any other message.

In yet another aspect, the recoding of the display on the screen of each device hosting the proctoring application is analyzed to identify when a message is sent from the communication device, wherein the sent message is a text message, an email, an application message, an audio message, a video message, or any other message.

In yet another aspect, the recoding of the display on the screen of each device hosting the proctoring application is analyzed to identify when an incoming call is received on the communication device.

In yet another aspect, the recoding of the display on the screen of each device hosting the proctoring application is analyzed to identify when an incoming audio call is received on the communication device.

In yet another aspect, the recoding of the display on the screen of each device hosting the proctoring application is analyzed to identify when an incoming audio/video call is received on the communication device.

In yet another aspect, the recoding of the display on the screen of each device hosting the proctoring application is analyzed to identify when an outbound call is being made using the communication device.

In yet another aspect, the recoding of the display on the screen of each device hosting the proctoring application is analyzed to identify when an outbound audio call is being made using the communication device.

In yet another aspect, the recoding of the display on the screen of each device hosting the proctoring application is analyzed to identify when an outbound audio/video call is being made using the communication device.

In yet another aspect, the recoding of the display on the screen of each device hosting the proctoring application is analyzed to identify when a photograph or video is acquired using the communication device.

In yet another aspect, the recoding of the display on the screen of each device hosting the proctoring application uses artificial intelligence to identify any anomaly displayed on the communication device.

In yet another aspect, the recoding of the display on the screen of each device hosting the proctoring application marks a time on the video when a significant change in the display occurs on the screen of the device.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Administration of tests or exams has advanced over time. In the past, common practice for administering of tests was to provide a printed test to a group of examinees in one or more rooms within a test administration location, normally a single, open room with a number of spatially arranged desks. One or more proctors monitor the test administration location, usually walking around the spatially arranged desks during the examination period. Test administration has advanced to a current state, where more and more tests are taken on a computer. The introduction of the computer also introduces a higher risk for examinees to cheat on the test. In a majority of the cases, the examinee taking a test administered on a computer is located remotely from the proctor. The present invention provides a proctoring system and a method of implementation increasing an affectivity of a proctoring process when tests are administered over computers, and even more so when the computers are located remotely from the proctoring company.

Figure 1:
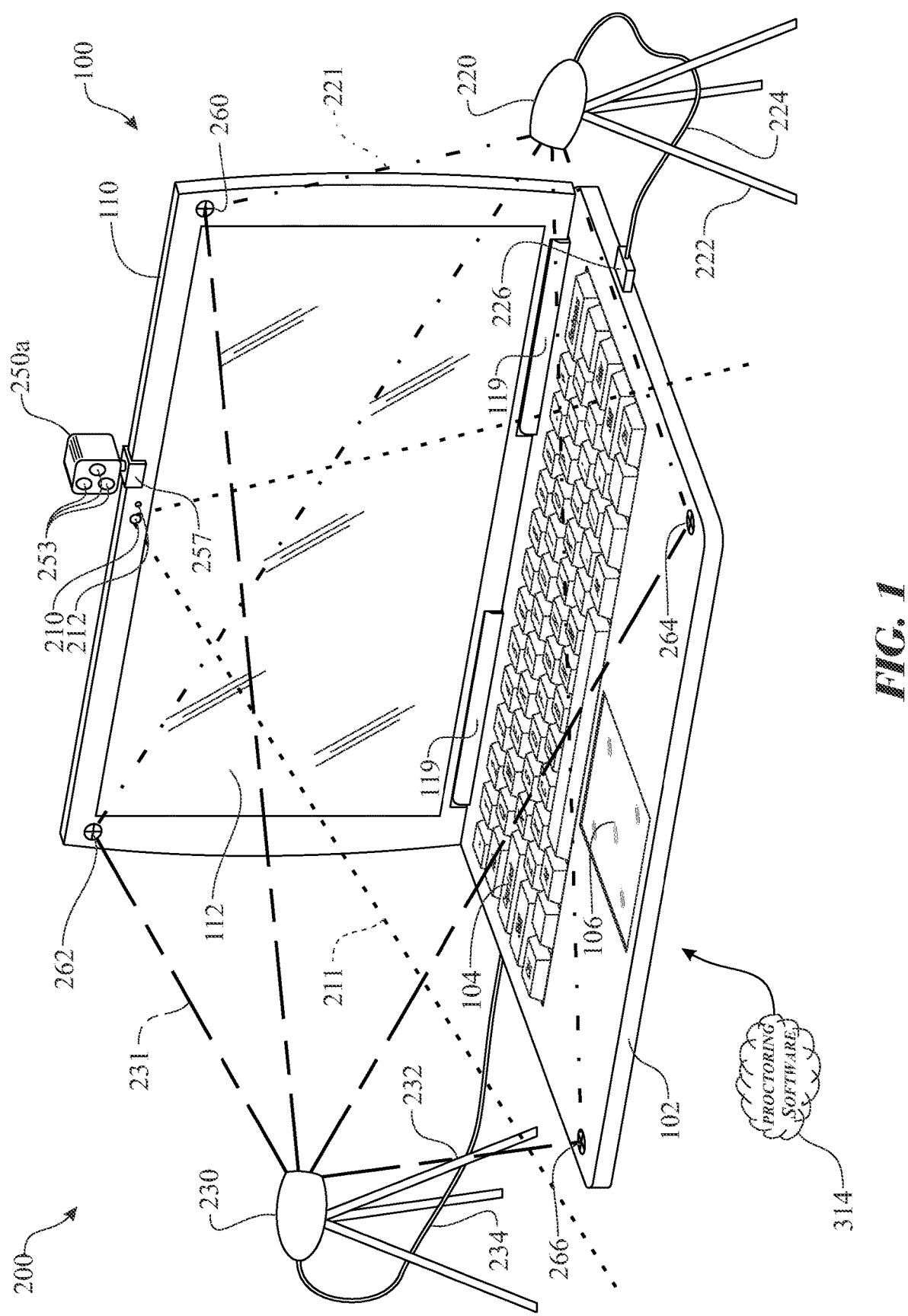
FIG. 1 presents an isometric front, top view of an exemplary test administration computer employing an exemplary test proctoring system.
Figure 4:
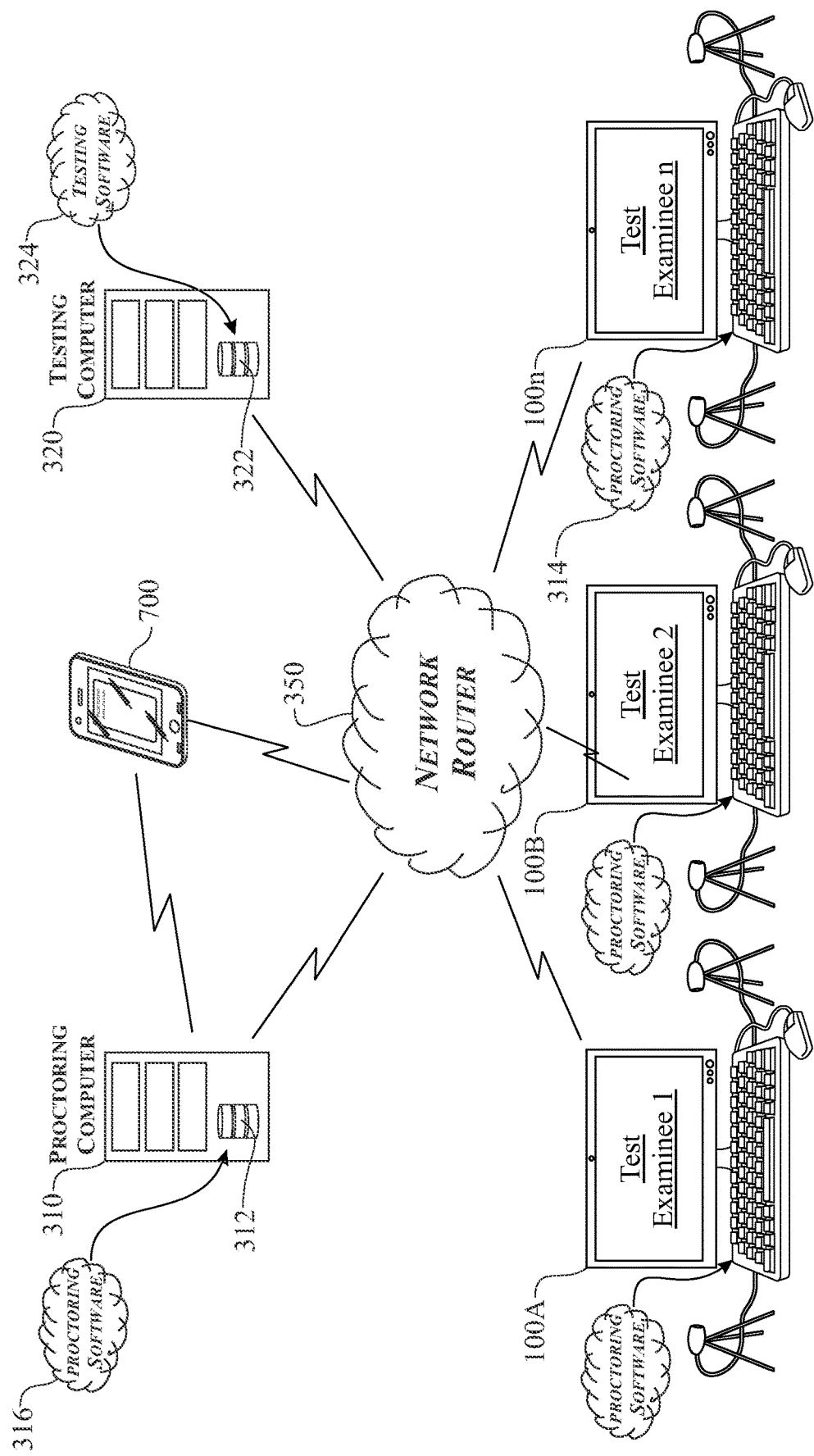
FIG. 4 presents a schematic diagram of an exemplary test administration and proctoring system.
Figure 5:
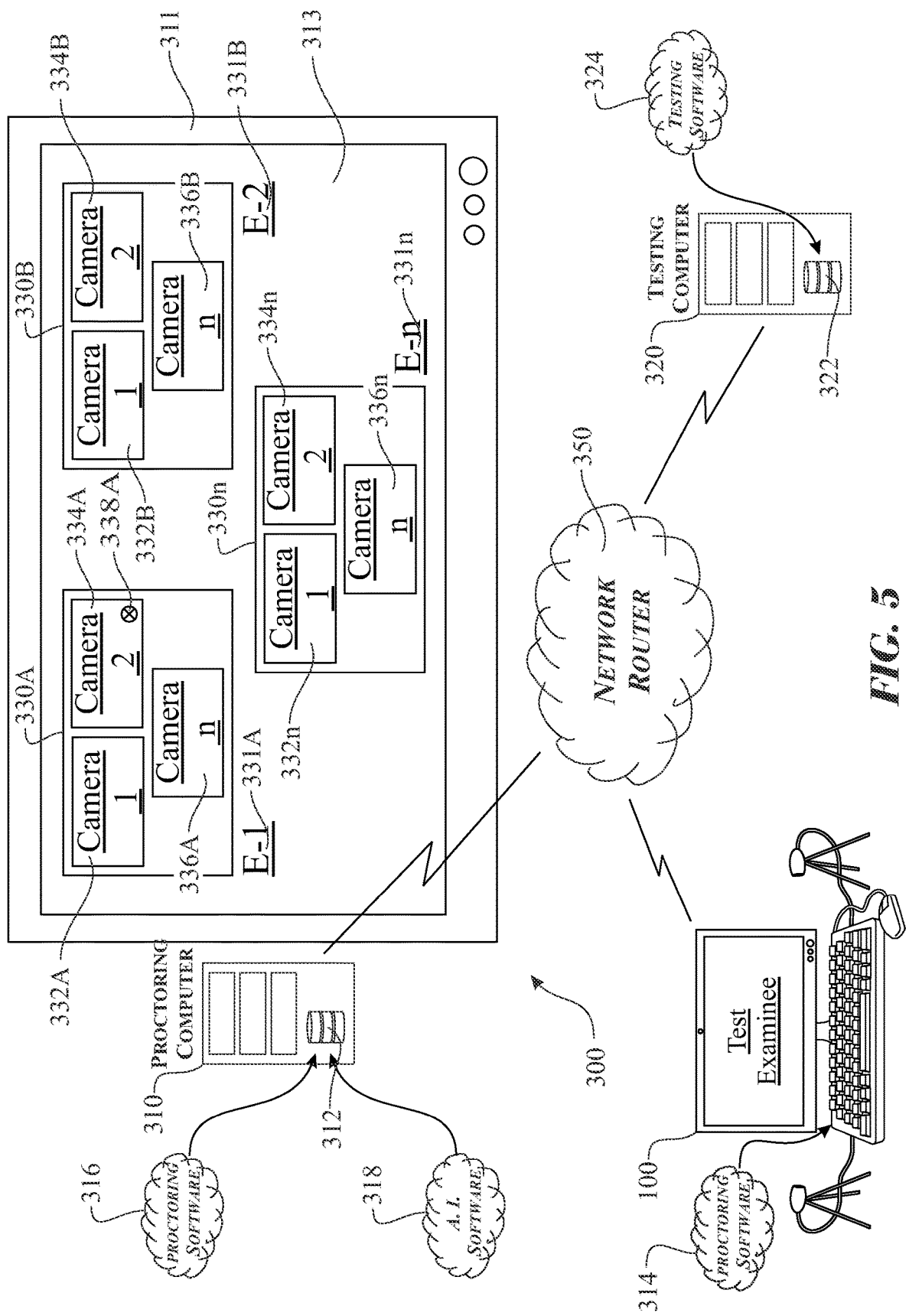
FIG. 5 presents a front elevation view of an exemplary proctoring system.

An exemplary proctoring acquisition system 200, introduced in FIG. 1, includes an integral webcam 210, a first digital proctoring camera 220, and proctoring software 190. The exemplary proctoring acquisition system 200 additionally includes a second digital proctoring camera 230. The exemplary proctoring acquisition system 200 is obtained by either the proctor or the examinee 290 (FIG. 2) and arranged where the digital proctoring cameras 210, 220, 230 are oriented to capture video including predetermined features within the testing administration area. The concept of the present invention is to capture video of the examinee 290, the keyboard, any peripheral accessories used while taking the test and the surrounding environment throughout the time allocated for administering the test or exam. The video feed from each digital proctoring camera 210, 220, 230 is forwarded to a proctor exam monitoring system 300 over a network 350 (FIG. 4). The proctor exam monitoring system 300 is best shown in FIG. 5.

In more detail, the proctoring acquisition system 200 is shown in a first exemplary arrangement about an exemplary test administering laptop computer 100, as illustrated in FIG. 1. The exemplary test administering laptop computer 100 includes a computer monitor frame 110 hingeably assembled to a laptop computer base 102 by at least one monitor hinge 119. A computer keyboard 104 is integrated into the laptop computer base 102. A computer input interface pointing device 106 can optionally be integrated into the laptop computer base 102. A display 112 is assembled within the computer monitor frame 110. Components associated with a portable computing system are integrated into the laptop computer base 102; these components can include a printed circuit board, at least one microprocessor, on board digital memory, a digital memory storage device, a portable power supply, various electronic components assembled to the printed circuit board, a display driver, at least communication circuit, at least one connector, a power charging circuit, an external power connector, an Ethernet connector and associated circuitry, and a video connector. In the exemplary embodiment, the test administering laptop computer 100 includes a Universal Serial Bus (USB) connector and associated circuitry. The computer input interface pointing device 106 can be a track pad (as shown), a trackball, or any other suitable pointer or digitizer. The test administering laptop computer 100 is representative of any suitable test administering computing device, wherein the test administering laptop computer 100 can be in a form of a laptop, a desktop (such as a test administering desktop computer 502 introduced in FIG. 3, a tablet computing device, a smart phone, or any other suitable computing device.

Figure 2:
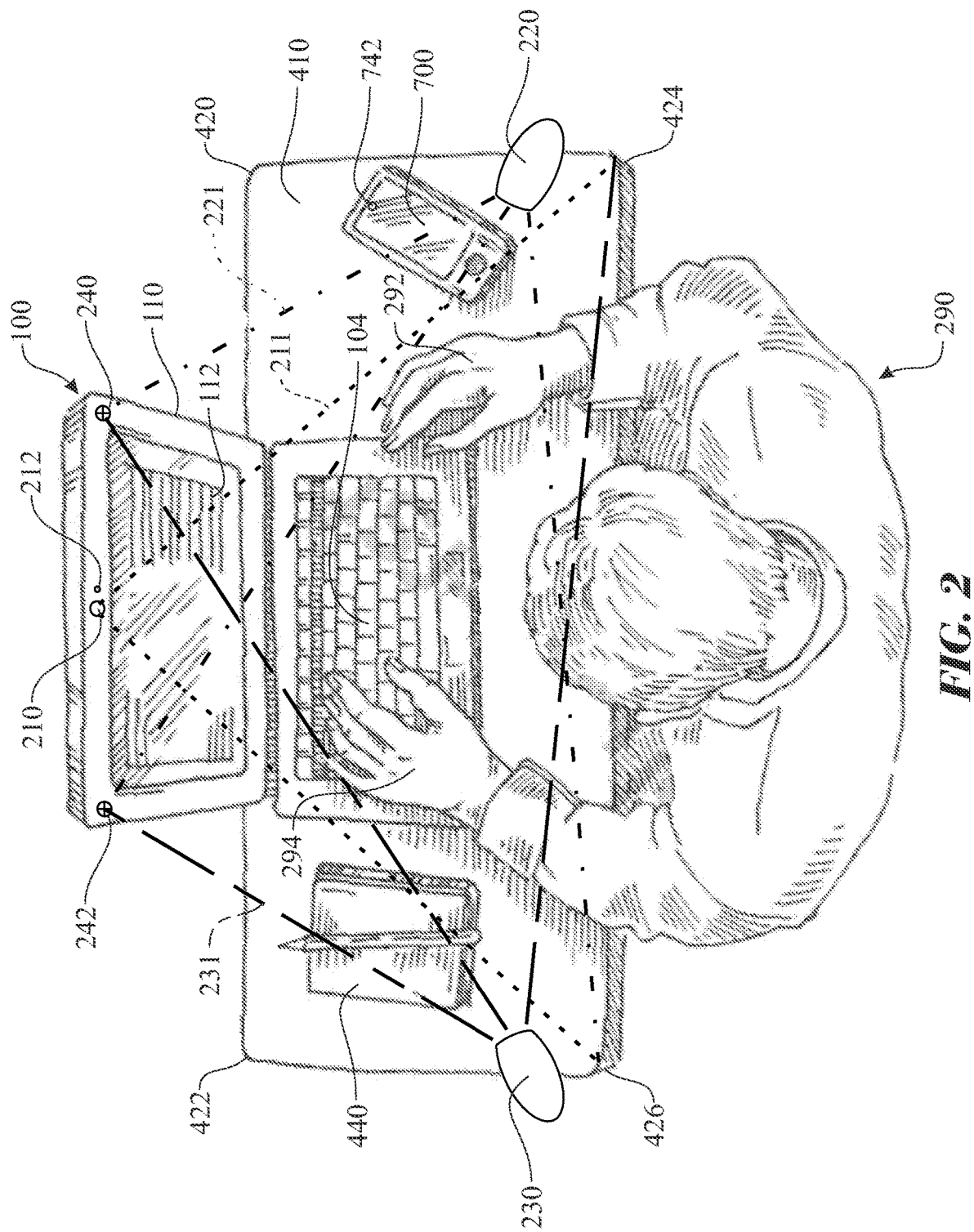
FIG. 2 presents an isometric top view of an exemplary test administration station employing the exemplary test proctoring system originally introduced in FIG. 1.

A first exemplary installation of the proctoring acquisition system 200 is illustrated in FIGS. 1 and 2. The proctoring acquisition system 200 is employed to monitor the examinee 290 during administration of a computer administered test. The proctoring acquisition system 200 can be supplies in a kit form to the proctor or the examinee 290. The proctoring acquisition system 200 can be arranged to utilize an integral webcam 210 and a microphone 212 integrated into the test administering laptop computer 100 or provided as a separate unit, such as the monitor mount digital proctoring camera 250 illustrated in FIGS. 3 and 7. The integral webcam 210 can be tested to ensure that a webcam field of view 211 of the integral webcam 210 is capable of obtaining video of the required area. If the integral webcam 210 is determined to be acceptable, the proctoring acquisition system 200 can utilize the integral webcam 210. Should it be determined that the integral webcam 210 is not acceptable, the monitor mount digital proctoring camera 250 can be employed. It is desired that the webcam field of view 211 would be capable of acquiring video of the examinee 290. The webcam field of view 211 would also be capable of acquiring video across the entire front edge of a testing workstation tabletop 410; extending between a testing workstation proximal right corner 424 and a testing workstation proximal left corner 426 of the testing workstation tabletop 410. The first digital proctoring camera 220 would be supported by a first digital proctoring camera stand 222. The first digital proctoring camera stand 222 can be a free standing design, a mounting design utilizing a clamp or other mounting system, employ a fixed mounting system such as a suction cup or other fixed mounting system, or any other suitable support system. The first digital proctoring camera stand 222 can include features to adjust a height of the first digital proctoring camera 220, an angle of the first digital proctoring camera 220, or any other adjustment enabling a change to an angle and/or viewing position of the first digital proctoring camera 220. A first digital proctoring camera power and data cable 224 would provide a power and signal connection between the first digital proctoring camera 220 and the test administering laptop computer 100. A first digital proctoring camera power and data cable connector 226, provided at a free end of the first digital proctoring camera power and data cable 224 would be inserted into a mating connector integrated within the laptop computer base 102. The first digital proctoring camera 220 would be located and oriented where a first digital proctoring camera field of view 221 acquires video of the entire display 112 of the test administering laptop computer 100, and preferably the entire computer keyboard 104 of the test administering laptop computer 100. The first digital proctoring camera field of view 221 can also be arranged to acquire video of the far side of the testing workstation tabletop 410 (respective to the location of the first digital proctoring camera 220), including acquiring video between a testing workstation distal left corner 422 and the testing workstation proximal left corner 426 of the testing workstation tabletop 410 as illustrated in FIG. 2. The second digital proctoring camera 230 is similar to the first digital proctoring camera 220. The second digital proctoring camera 230 would be employed in a condition where the first digital proctoring camera field of view 221 is inadequate for video coverage of the entire testing workstation tabletop 410.

The second digital proctoring camera 230 would be supported by a second digital proctoring camera stand 232. The second digital proctoring camera stand 232 can be a free standing design, a mounting design utilizing a clamp or other mounting system, employ a fixed mounting system such as a suction cup or other fixed mounting system, or any other suitable support system. The second digital proctoring camera stand 232 would be similar to the first digital proctoring camera stand 222 as described above. A second digital proctoring camera power and data cable 234, having a second digital proctoring camera power and data cable connector (not shown) at a free end thereof, would provide a power and signal connection between the second digital proctoring camera 230 and the test administering laptop computer 100 in a similar manner to the first digital proctoring camera power and data cable 224, as described above. The second digital proctoring camera 230 would be located and oriented where a second digital proctoring camera field of view 231 also acquires video of the entire display 112 of the test administering laptop computer 100, and preferably the entire computer keyboard 104 of the test administering laptop computer 100. The second digital proctoring camera field of view 231 can also be arranged to acquire video of the far side of the testing workstation tabletop 410 (respective to the location of the second digital proctoring camera 230), including acquiring video between a testing workstation distal right corner 420 and the testing workstation proximal right corner 424 of the testing workstation tabletop 410 as illustrated in FIG. 2.

The arrangement of the integral webcam 210, the first digital proctoring camera 220, and the second digital proctoring camera 230 provides a webcam field of view 211, a first digital proctoring camera field of view 221, and a second digital proctoring camera field of view 231 which collectively captures video of the entire test administration area, including the computer keyboard 104, the display 112, the working surface of the testing workstation tabletop 410, and the examinee 290. The integrated camera 742 can be used as one of the first digital proctoring camera 220, and the second digital proctoring camera 230 or added as a third digital proctoring camera 742.

The proctoring acquisition system 200 can include reference markers 260, 262, 264, 266, which would be temporarily applied to the test administering laptop computer 100. The first display reference marker 260 would be placed upon the upper, right corner of the computer monitor frame 110. Reference markers similar to reference markers 260, 262 can be placed upon the lower, right corner of the computer monitor frame 110 and the lower, left corner of the computer monitor frame 110. The second display reference marker 262 would be placed upon the upper, left corner of the computer monitor frame 110. The first keyboard reference marker 264 would be placed upon the front, right corner of the laptop computer base 102. The second keyboard reference marker 266 would be placed upon the front, left corner of the laptop computer base 102. Reference markers similar to reference markers 264, 266 can be placed upon the rear, right corner of the computer monitor frame 110 and the rear, left corner of the computer monitor frame 110.

A monitor mount multi-lens digital proctoring camera 250a can be employed as an alternative or a compliment to the integral webcam 210. The monitor mount multi-lens digital proctoring camera 250a would be secured to an upper edge of the computer monitor frame 110 using a monitor mount proctoring camera attachment base 257. The monitor mount multi-lens digital proctoring camera 250a can include any arrangement of lenses 253 that enable digital removal of any unnecessary background portions of acquired images/video. This would be similar to editing properties offered by background erasing editing tools. In the exemplary illustration, the monitor mount multi-lens digital proctoring camera 250a includes three lenses 253. The multiple lenses can be configured to focus at different distances. This can be used to aid in the removal of the background portion of the acquired images/video.

Figure 3:
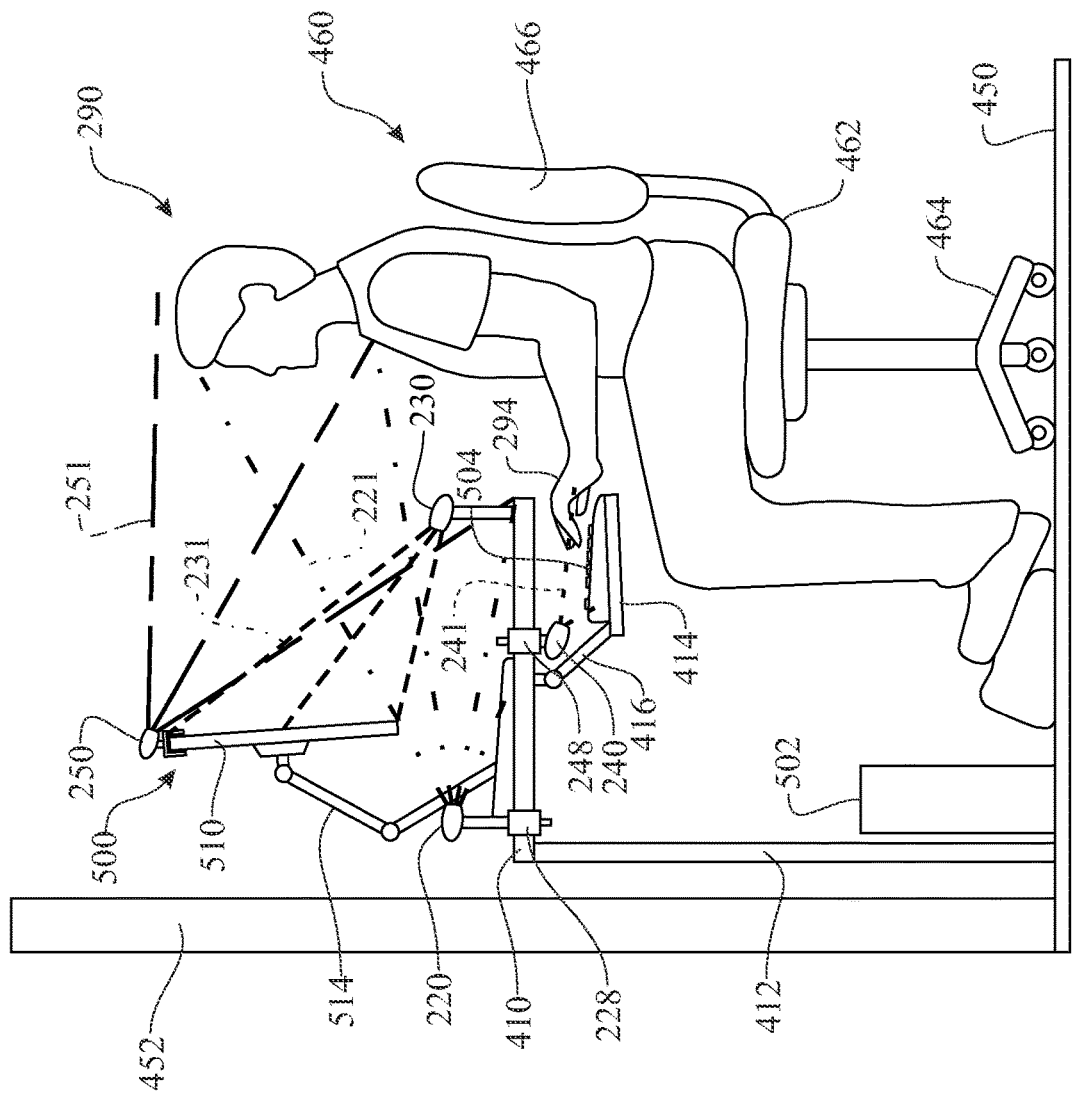
FIG. 3 presents an elevation, left side view of another exemplary test administration station employing a variation of the test proctoring system originally introduced in FIG. 1.

An alternative exemplary arrangement of the proctoring acquisition system 200 is illustrated in FIG. 3. The exemplary environment illustrated in FIG. 3 includes a floor 450, a wall 452 extending upward from the floor 450 and preferably located along a rear edge of the testing workstation tabletop 410. An examinee chair 460 is provided to support the examinee 290 during the testing process. The examinee chair 460 includes an examinee chair seat 462 supported by an examinee chair base 464. The examinee chair base 464 commonly includes rollers (as illustrated) enabling ease of movement on the floor 450. An examinee chair seat back 466 extends upwards from a rear portion of the examinee chair seat 462. The examinee 290 would remain seated within the examinee chair 460 throughout the duration of the test or, when the test is segmented, throughout each segment of the test.

In the exemplary arrangement illustrated in FIG. 3, an illustrated test administering desktop computing system 500 comprises a test administering desktop computer 502 is located on a floor 450. In other installations, the test administering desktop computer 502 can be placed upon a top surface of the testing workstation tabletop 410, mounted to an underside of the testing workstation tabletop 410, mounted to the testing workstation stand 412, mounted to the wall 452, or any other suitable installation. A monitor frame 510, carrying a display which presents images generated by the test administering desktop computer 502, is supported by a monitor frame stand 514. The monitor frame stand 514 can be supported by a base, secured to the testing workstation tabletop 410, or secured to a wall 452. A computer keyboard 504 is supported by a testing workstation keyboard support platform 414, positionably attached to the testing workstation tabletop 410 by a testing workstation keyboard support assembly 416. The exemplary testing workstation keyboard support platform 414 is located below a plane of the testing workstation tabletop 410, which requires a different proctoring arrangement compared to the arrangement illustrated in FIG. 2. The testing workstation tabletop 410 is supported by a testing workstation stand 412, which is supported by the floor 450. Although the testing workstation tabletop 410 is illustrated as being supported by the testing workstation stand 412, the testing workstation tabletop 410 can be supported by the wall 452 or any other suitable support configuration. The placement of the testing workstation tabletop 410 against the wall 452 eliminates any potential for other persons to be situated behind the testing workstation tabletop 410, where the other person may be outside of the viewing area of all of the digital proctoring cameras 220, 230, 240, 250.

In the exemplary arrangement of the proctoring acquisition system 200, the first digital proctoring camera 220 is secured to the testing workstation tabletop 410 by a first digital proctoring camera mount 228 at a location proximate a rear of the testing workstation tabletop 410. The first digital proctoring camera 220 is oriented to acquire video of objects located within the first digital proctoring camera field of view 221, including the examinee 290. The first digital proctoring camera 220 can be oriented to also capture video images of the desktop of the testing workstation tabletop 410.

The second digital proctoring camera 230 is secured to the testing workstation tabletop 410 in a manner similar to the mounting of the first digital proctoring camera 220 at a location proximate a front edge of the testing workstation tabletop 410. The second digital proctoring camera 230 is oriented to acquire video of objects located within the second digital proctoring camera field of view 231, including a display of the monitor frame 510.

The third digital proctoring camera 240 is mounted to the testing workstation tabletop 410, using a third digital proctoring camera mount 248, at an orientation directing a third digital proctoring camera field of view 241 downward, towards the computer keyboard 504. This mounting enables the third digital proctoring camera 240 to capture video of all keystrokes provided by each hand 292, 294 of the examinee 290 even though the computer keyboard 504 is located below the surface of the testing workstation tabletop 410.

The monitor mount digital proctoring camera 250 is secured to an upper edge of the monitor frame 510 by a monitor mount digital proctoring camera frame grip 258 (FIG. 7) and supported by a monitor mount digital proctoring camera support member 252 extending between the monitor mount digital proctoring camera frame grip 258 and the monitor mount digital proctoring camera 250. The monitor mount digital proctoring camera 250 is oriented to acquire video of objects located within the monitor mount digital proctoring camera field of view 251, including the examinee 290. The first digital proctoring camera 220 (or a second digital proctoring camera 230, not shown) can be oriented to also capture video images of the desktop of the testing workstation tabletop 410.

One or more of the digital proctoring cameras 220, 230, 240, 250 can include a thermal imaging system. The thermal imaging system introduces a capability to identify all living entities (such as other persons) within the test administering area, identify any portable computing/communicating device 700 (or similar devices) that are powered on within the test administering area, and any other heat generating item. The thermal imaging system would remain active throughout the entire test administering period. The thermal imaging system would monitor for persons entering, leaving, or residing within each test administering area. The thermal imaging system would monitor for any change respective to any and all computing devices (represented by the portable computing/communicating device 700) within each test administering area. This can include activation of any computing/communication device 700, deactivation of any computing/communication device 700, movement of any computing/communication device 700, or any other suspicious activities related to any computing/communication device 700.

A test administration network is presented in an illustration of FIG. 4. The exemplary illustration includes a first examinee testing station 100A, a second examinee testing station 100B, and an nth examinee testing station 100n, where the nth examinee testing station 100n is representative of any additional number of examinee testing stations 100. Each examinee testing station 100A, 100B, 100n would include an employment of a proctoring acquisition system 200. Each examinee testing station 100A, 100B, 100n would be connected to a proctor exam monitoring server 310 and a test administrating server 320 via a network controlling/routing system 350. The connectivity can be provided using any suitable protocol or mixture of protocols. For example, the first examinee testing station 100A can be connected to the network controlling/routing system 350 using an Ethernet connection over a wired connection, such as a landline, coaxial line, or a fiber optic line. The second examinee testing station 100B can be connected to the network controlling/routing system 350 using a wireless connection such as Wi-Fi to a modem, wherein the modem is connected to the network controlling/routing system 350 via a wired connection. The nth examinee testing station 100n can be connected to the network controlling/routing system 350 using a wireless connection such as a cellular connection, wherein the cellular connection provides communication directly or indirectly to the network controlling/routing system 350. The proctor exam monitoring server 310 includes all elements commonly known to be included within a network server, including a microprocessor, a proctor exam monitoring server digital storage media 312 in communication with the microprocessor, a communication circuit in communication with the microprocessor, and any other known elements associated with a network server or computer. Proctor exam monitoring software 316 is configured to run on or in conjunction with the proctor exam monitoring server 310.

The test administrating server 320 can be similar to the proctor exam monitoring server 310, where the test administrating server 320 also includes all elements commonly known to be included within a network server, including a microprocessor, a test administrating server digital storage media 322 in communication with the microprocessor, a communication circuit in communication with the microprocessor, and any other known elements associated with a network server or computer.

Proctor examinee station software 314 can be stored on the proctor exam monitoring server digital storage media 312 of the proctor exam monitoring server 310 or on the test administrating server digital storage media 322 of the test administrating server 320. Each examinee testing station 100A, 100B, 100n can access and optionally download the proctor examinee station software 314 from a source via the network. Alternatively, the proctor examinee station software 314 can be provided on a portable memory device, such as a Compact Disc (CD), a digital optical disc (DVD), a Universal Serial Bus (USB memory stick), a secure digital (SD) memory card, or any other portable digital memory storage device. The portable digital memory storage device can be included with the kit containing the digital proctoring cameras 220, 230, 240, 250.

A proctoring application 720 (FIG. 9) can be installed onto the portable computing/communicating device 700. The proctoring application 720 can provide communication between the proctor exam monitoring server 310 and the portable computing/communicating device 700 directly or via the network controlling/routing system 350, as illustrated in FIG. 4. The network controlling/routing system 350 can seek and identify any and all active electronic devices by searching for wireless protocol names, media access control addressed (MAC addresses), assigned IP addresses, or any other listing that might be identified on a Dynamic Host Configuration Protocol (DHCP) table. The proctor exam monitoring server 310 can utilize the obtained information to identify each portable computing/communicating device 700, each test administering laptop computer 100, test administering desktop computer 502, and any other equipment of interest located within the test administering area.

Details of the proctor exam monitoring system 300 are presented in FIG. 5. Any number of examinee testing stations 100 is represented by the single illustrated examinee testing station 100. Each exemplary examinee testing station 100 is in data communication with the network controlling/routing system 350 using any known, suitable data communication protocol. The test administrating server 320 is also in data communication with the network controlling/routing system 350 using any known, suitable data communication protocol. Information from each exemplary examinee testing station 100 would be transferred to the proctor exam monitoring server 310 by the network controlling/routing system 350 over the network. The information can include video acquired by each of the digital proctoring cameras 210, 220, 230, 240, 250, keystroke information, peripheral entry information, screen display information, and any other information that can be captured by the proctor examinee station software 314. The received information can be processed by a proctor exam monitoring artificial intelligence software 318 either by the proctor exam monitoring server 310 or by a different processing device to determine if any anomalies occur during the administration of the test. Prior to initiating the test taking process, the proctoring system can request that the examinee 290 provide scanned copies of all paper products or documents 440 that are in a proximity of and might be used by the examinee 290 during the test. Additionally, prior to initiating the test taking process, the proctoring system can request that the examinee 290 present all electronic devices 700 that are in a proximity of and might be used by the examinee 290 during the test. Details of the components of an exemplary portable computing/communication device 700 are presented in a schematic diagram illustrated in FIG. 9. The proctor exam monitoring artificial intelligence software 318 can utilize the information provided by the Examinee 290 prior to initiating the test with paper products or documents 440 and electronic devices 700 used during the administration period of the exam to determine any potential anomalies. Should the proctor exam monitoring artificial intelligence software 318 determine a potential anomaly occurs; the proctor exam monitoring artificial intelligence software 318 can initiate an alert to inform the live proctor of the potential anomaly. The alert can be in any suitable form, including an audible alert, a visual alert, such as a first examinee artificial intelligence alert 338A, a tactile alert that can be carried or worn by the proctor, a combination of two or more alerts, or any other suitable alert.

The Examinee 290 can utilize any of the cameras, 210, 220, 230, or an integrated camera 742 (for example, a camera integrated into the Smartphone or electronic device 700) to use a video conferencing application, such as a ZOOM® app or GOOGLE® hangouts to record the work space of the Examinee 290. This can be included as a requirement initiated by the proctoring company.

Proctor exam monitoring software 316 can be employed to receive each of the video data captured by each proctoring acquisition system 200 employed by each respective test administering laptop computer 100. The collected video is presented on a proctoring monitor display 313 of a proctoring monitor 311 in any visually reasonable organization. In the exemplary illustration, video data captured from each of the digital proctoring cameras 210, 220, 230, 240, 250 from each examinee testing station 100 is presented in a cluster. Each cluster is identified by a different suffix, A, B, n. The cluster associated with the Examinee 1 is identified by a suffix "A". The cluster associated with the Examinee 2 is identified by a suffix "B". The cluster associated with each additional Examinee n of any number of examinees is identified by a suffix "n". Each cluster can be presented within an examinee monitoring window 330A, 330B, 330n. Using the cluster associated with the Examinee 1 (identified by a suffix "A") as being exemplary for each of the three exemplary clusters, the cluster is identified by a first examinee identifier 331A. Video provided by a first digital proctoring camera 210, 220, 230, 240, 250 is displayed in a first examinee monitoring window first camera video 332A. Video provided by a second digital proctoring camera 210, 220, 230, 240, 250 is displayed in a first examinee monitoring window second camera video 334A. Video provided by an nth digital proctoring camera 210, 220, 230, 240, 250 is displayed in a first examinee monitoring window nth camera video 336A. In the exemplary cluster, an anomaly has been identified by the proctor exam monitoring artificial intelligence software 318 and the proctor exam monitoring artificial intelligence software 318 has activated an alert, represented in FIG. 5 by a first examinee artificial intelligence alert 338A. The first examinee artificial intelligence alert 338A is representative of any visual alert, audible alert, or any other suitable alert.

The number of clusters would preferably be limited to ensure that the number of video feeds would not overwhelm an individual proctor. It is also understood that the video can be recorded, allowing a display of additional video feeds to the proctor, where the thoroughness of the proctor can be supplemented by reviewing the video in either real time and/or reviewing the recorded video.

The test administrating software 324 can be utilized for any of a number of functions. A first exemplary function is a generation of a test or exam. The test can be created as a serialized group of tests, where each test is uniquely identified and includes a common set of test questions or instructions, while the set of test questions or instructions are presented in a unique order when compared to an order of the set of test questions or instructions of other serialized tests. Alternatively, the set of test questions or instructions included in each serialized test can be a subset of a larger or overall set of test questions or instructions. The subset of the larger or overall set of test questions or instructions can be presented in the same order as established by the larger or overall set of test questions or instructions or presented in different orders. The test administrating software 324 can create and maintain an index associating each serialized test with a respective examinee 290. In one example, each examinee 290 can include an identifier, which would be associated with the serialized test. In a second example, a Media Access Control (MAC) address of the test administering laptop computer 100 used by the examinee 290 can be used as the identifier, which would be associated with the serialized test. In a third example, an Internet Protocol (IP) address of the test administering laptop computer 100 used by the examinee 290 can be used as the identifier, which would be associated with the serialized test. The distribution of each test or exam can be provided via the network controlling/routing system 350.

During the administration of the test, the proctor would monitor each video feed to ensure against any improprieties. Should the proctor need, the proctor can rewind the video, enlarge the video, or use any other suitable technique to determine if the examinee 290 is potentially or actually cheating. The proctor exam monitoring software 316 can enable the proctor to mark, edit, annotate or any other method identify a portion of the video which appears to indicate an impropriety of one or more examinees 290. The proctoring can be enhanced by employing proctor exam monitoring artificial intelligence software 318, of which certain features have been described above. In addition to the previously presented functions provided by the proctor exam monitoring artificial intelligence software 318, the proctor exam monitoring artificial intelligence software 318 can additionally audit characters displayed on the display 112 and compare the characters displayed with the recorded keystrokes. The system can additionally utilize timestamps to ensure that the displayed characters and the recorded keystrokes are properly synchronized. The proctor exam monitoring artificial intelligence software 318 can monitor for anomalies in any background sounds recorded by the microphone 212. The proctor exam monitoring artificial intelligence software 318 can determine is a second person is within the area of the examinee 290. In general, the proctor exam monitoring artificial intelligence software 318 can be programmed to identify any reasonable anomaly using the information provided by the proctoring acquisition system 200.

Figure 6:
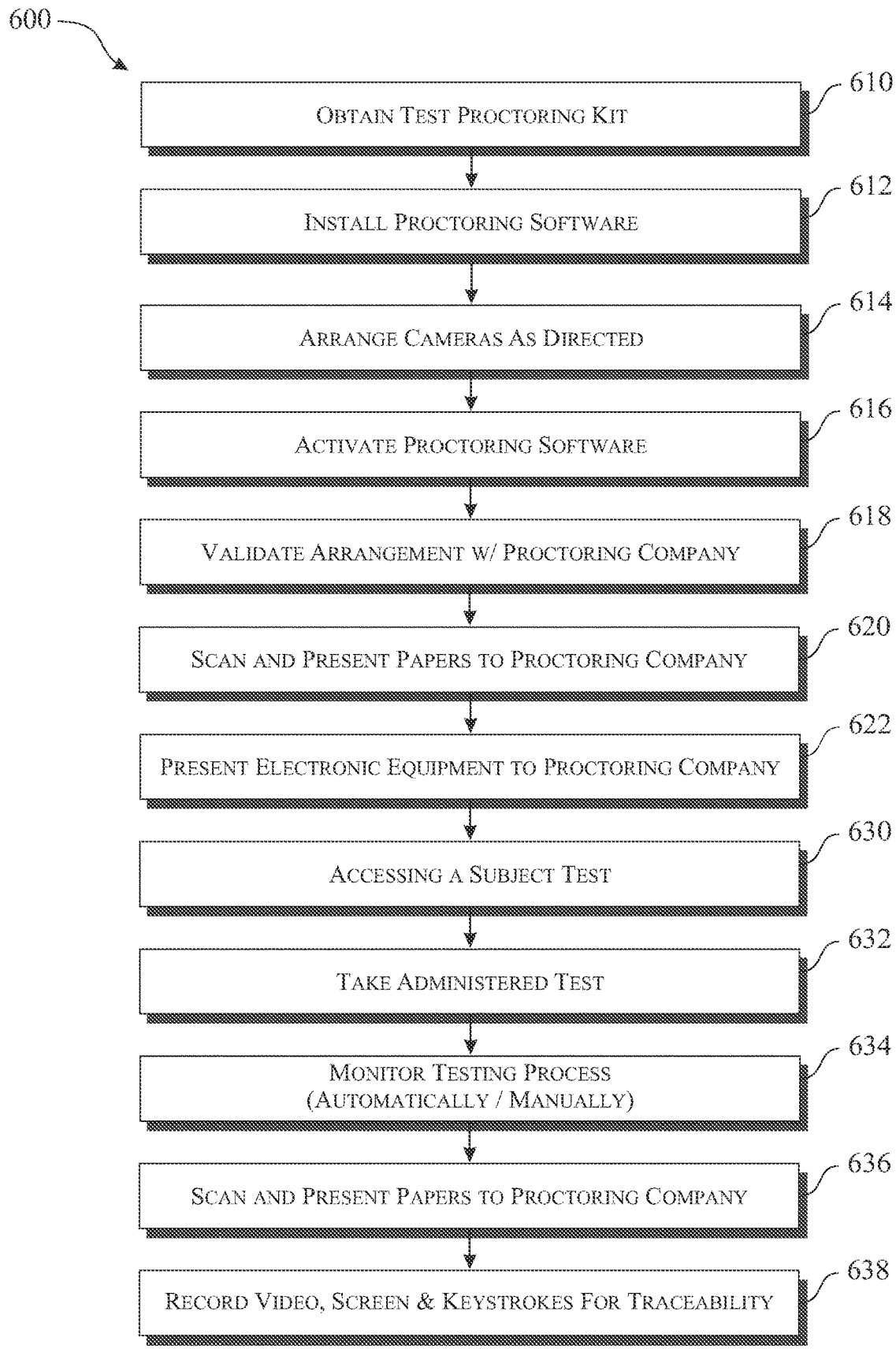
FIG. 6 presents an exemplary flow diagram illustrating steps for administering and proctoring a test.

A test proctoring method 600, presented in FIG. 6, describes an exemplary method of installing and using the proctoring acquisition system 200. The test proctoring method 600 initiates with a step of obtaining a kit containing the proctoring acquisition system 200 (step 610). The proctor examinee station software 314 is installed (or remotely accessed for use during a test administration period) on the test administering laptop computer 100 (step 612). The proctoring acquisition system 200 includes at least one digital proctoring camera 220, 230, 240, 250. An integral webcam 210 (integrated within the test administering laptop computer 100) can be employed as a digital proctoring camera during the text administration period. The at least one digital proctoring camera 220, 230, 240, 250 and/or the integral webcam 210 to include at least two (2) total digital proctoring cameras 210, 220, 230, 240, 250 would be arranged to capture the desired video within the respective digital proctoring camera field of view 211, 221, 231, 241, 251 (step 614). Details of exemplary arrangements of the at least two (2) total digital proctoring cameras 210, 220, 230, 240, 250 are presented above. The purpose of the at least two (2) total digital proctoring cameras 210, 220, 230, 240, 250 is to capture continuous video of the examinee 290; capture continuous video of movements of the examinee's hands 292, 294 on the computer keyboard 104; 504; capture continuous video of activity on the display 112, capture a time from a displayed clock or other indicator of time, capture continuous video of a desk top to determine, what, if any, papers, electronics, or other items are used to aid the examinee in taking the test; and the like.

Once the at least two (2) total digital proctoring cameras 210, 220, 230, 240, 250 are assumed to be arranged properly, the proctor examinee station software 314 can be activated (step 616). The activated proctor examinee station software 314 would activate each of the at least two (2) total digital proctoring cameras 210, 220, 230, 240, 250 and capture a sample video from each of the at least two (2) total digital proctoring cameras 210, 220, 230, 240, 250. The captured sample video would be forwarded to the proctor exam monitoring system 300 for validation. The proctor exam monitoring system 300 would then validate the arrangement of the at least two (2) total digital proctoring cameras 210, 220, 230, 240, 250 based upon a review of the captured sample video provided by the proctor examinee station software 314 from the test administering laptop computer 100 of the examinee 290 (step 618). The validation can be processed by the proctor exam monitoring software 316, the proctor exam monitoring artificial intelligence software 318 or a proctor. Upon validation, the proctor examinee station software 314 would receive an appropriate notification. Should the arrangement be deemed inadequate, the proctor examinee station software 314 would receive an appropriate notification and inform the examinee 290 accordingly. In a preferred process, the proctor examinee station software 314 would include feedback and instructions to the examinee 290 to aid in steps to correct the arrangement of the at least two (2) total digital proctoring cameras 210, 220, 230, 240, 250. In a condition where the arrangement as deemed to be inadequate, the validation process (step 618) would be repeated until the arrangement is considered to be acceptable.

The preparations can include a step of directing the examinee 290 to digitize (such as by scanning, photographing, and the like) each page of each paper product or document 440 that may be used while taking the test or exam. The digitized images of the paper product or document 440 would be presented to the proctor exam monitoring system 300 using any suitable presentation process, including email, uploading to a website, utilizing any of the at least two (2) total digital proctoring cameras 210, 220, 230, 240, 250, or any other suitable presentation method (step 620).

The preparations can additionally include a step of directing the examinee 290 to activate and present each electronic device 700 to the proctor exam monitoring system 300. This can be accomplished by activating each electronic device 700 and locating a display of each electronic device 700 within a field of view of any of the at least two (2) total digital proctoring cameras 210, 220, 230, 240, 250 (step 622).

At this point, the test administering laptop computer 100 is suitably prepared to administer the test or exam. The test or exam can be acquired from the test administering server digital storage media 322 of the test administering server 320 using the test administrating software 324 (step 630). The test or exam can be run on a remote system, where the test administering laptop computer 100 would function as a workstation or the test or exam can be downloaded to the test administering laptop computer 100, then run on the test administering laptop computer 100.

At this point, the examinee 290 is ready to commence with taking the test (step 632). The examinee 290 would begin taking the test or exam upon receiving instructions to do so. This may be implemented when the administration of the test is conducted over a timed test administration period. The examinee 290 would provide answers and/or responses to each question or instruction presented by the test over the administration time period. During this time, the at least two (2) total digital proctoring cameras 210, 220, 230, 240, 250 and the microphone 212 would capture video and audio and provide the captured video and audio to the proctor exam monitoring system 300 for monitoring (634) using the monitoring practices described herein. Any identified improprieties can be documented by the proctor exam monitoring system 300 in a manner to associate the identified improprieties with the respective examinee 290. The documented improprieties can be further reviewed to determine if any action resulting from the documented improprieties is required. Upon completion of the test, the examinee 290 can repeat the step of directing the examinee 290 to digitize (such as by scanning, photographing, and the like) each page of each paper product or document 440 that was available for use while taking the test or exam to determine if any notes were taken or if any other potential impropriety occurred (step 636). The provided scans would be saved for documentation. The proctor exam monitoring system 300 can additionally save the video captured by the at least two (2) total digital proctoring cameras 210, 220, 230, 240, 250 and provided to the proctor exam monitoring system 300, save the screen capture recordings, save the digitally recorded keystrokes, and save any and all other provided information for traceability (step 638). Although the test proctoring method 600 presents a series of steps, the illustrated test proctoring method 600 is only exemplary and it is understood that the order of the steps may differ, the process may include or exclude one or more steps, the process of executing any step may differ from the description presented herein, and the like.

The field of view of the digital proctoring cameras 210, 220, 230, 240, 250 may be limited to an area that is unacceptable to adequately monitor a test administrating station, such as the test administrating station illustrated in FIG. 2 or the test administrating station illustrated in FIG. 3. It is known that examinees have obtain support from other individuals while taking computer administered tests or exams. The field of view of the digital proctoring cameras 210, 220, 230, 240, 250 may limit the captured video where an aiding individual can remain out of view of the field of view of the digital proctoring cameras 210, 220, 230, 240, 250.

Figure 7:
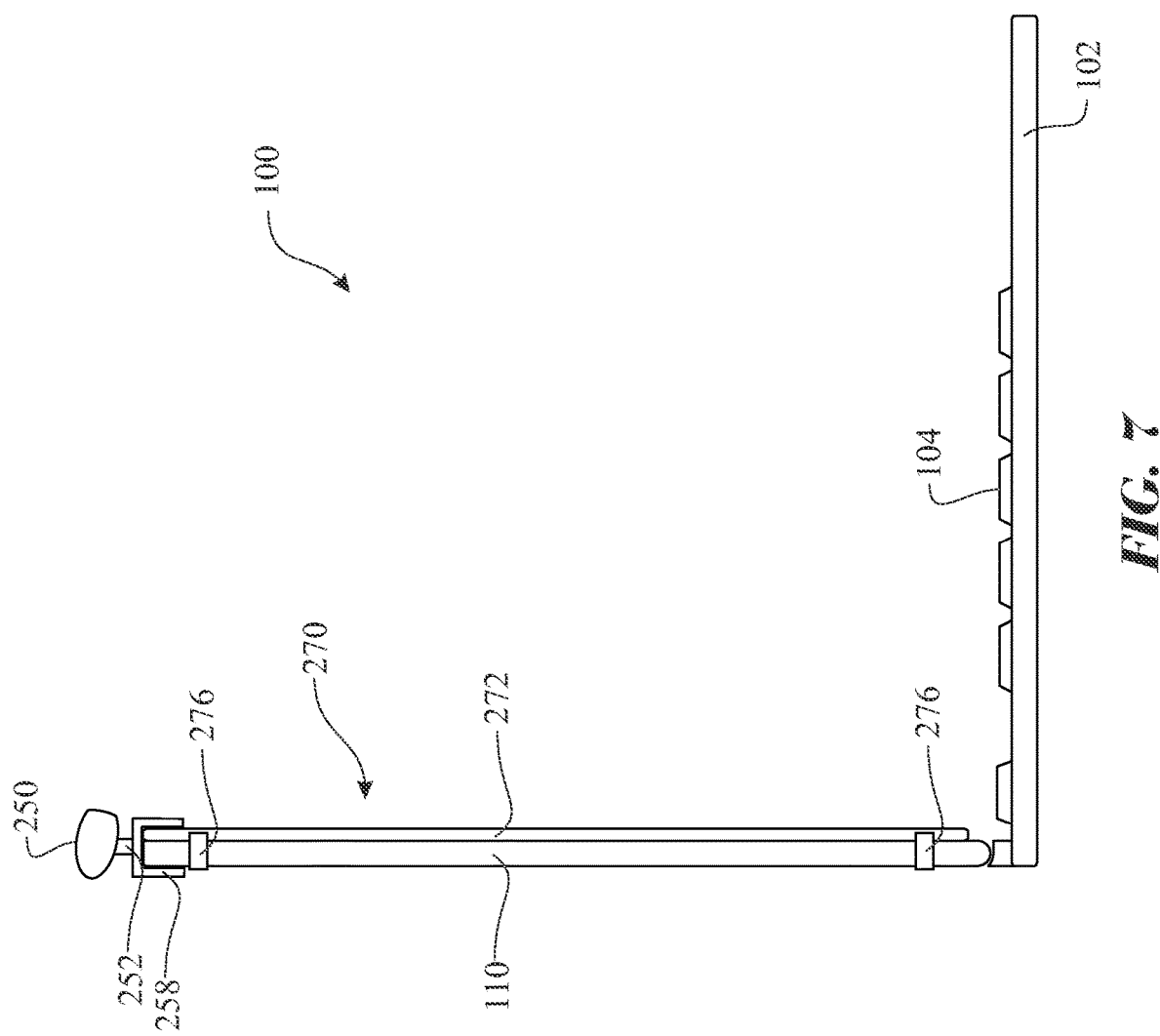
FIG. 7 presents a side elevation view of an exemplary test administration system as introduced in FIG. 1, the exemplary test administration system further comprising a privacy screen.
Figure 8:
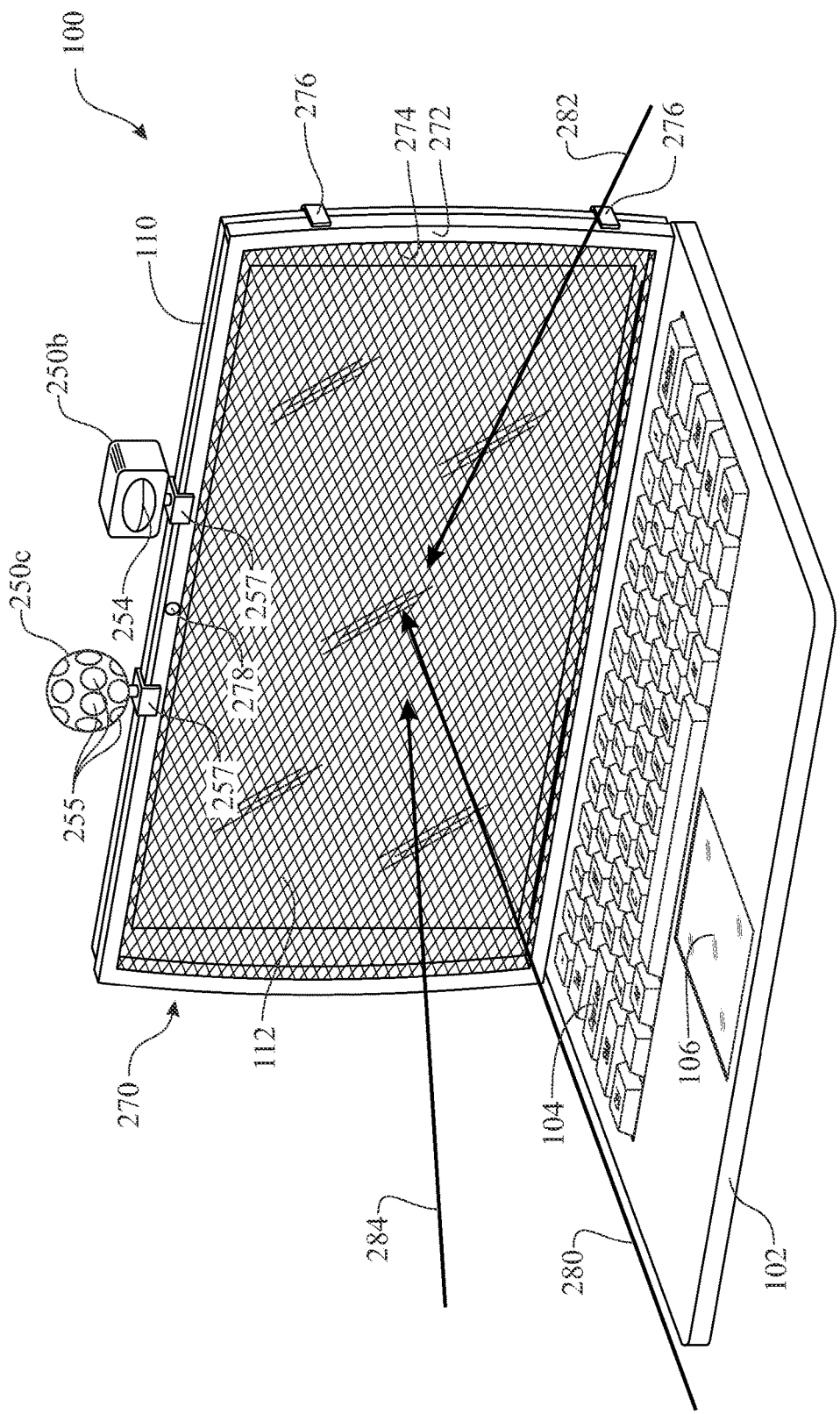
FIG. 8 presents a front, right side isometric view of the exemplary test administration system introduced in FIG. 7.

The proctoring acquisition system 200 can additionally include a privacy filter 270, introduced in FIGS. 7 and 8. The privacy filter 270 can be provided in conjunction with the digital proctoring cameras 220, 230, 240, 250 and proctor examinee station software 314. The privacy filter 270 includes a privacy filter screen 274 supported by a privacy filter frame 272. The privacy filter screen 274 is preferably sized having a width and height that is substantially similar to or greater than a width and height of the display 112. The privacy filter frame 272 is preferably sized having a width and height that is similar to a width and height of the computer monitor frame 110. The privacy filter frame 272 can be rectangular in shape or following any shaping of the computer monitor frame 110. It is understood that the privacy filter 270 would be configured for multiple monitors of a like size classification and therefore may not follow a peripheral shape of the computer monitor frame 110. The privacy filter 270 can be secured to the computer monitor frame 110 using any suitable temporary attachment interfaces, including a privacy filter retention member 276 (as illustrated), a ribbon, an adhesive, a double sided tape, a clamp, or any other suitable temporary attachment interface.

The privacy filter screen 274 of the privacy filter 270 permits a viewing area between a privacy filter right viewing angle limit 282 and a privacy filter left viewing angle limit 284. This enables the examinee 290 to view images displayed on the display 112, such as via a privacy filter examinee viewing angle 280, but restricts any viewing of images displayed on the display 112 from an angle greater than the privacy filter right viewing angle limit 282 or the privacy filter left viewing angle limit 284.

The privacy filter 270 can include a privacy filter webcam aperture 278 to accommodate the integral webcam 210. Alternatively, a monitor mount digital proctoring camera 250 can be installed where the monitor mount digital proctoring camera frame grip 258 can straddle both, the computer monitor frame 110 and the privacy filter frame 272, as shown in FIG. 7.

The information on the display 112 can be captured by positioning the digital proctoring cameras 220, 230 within the angles defined by the privacy filter right viewing angle limit 282 and the privacy filter left viewing angle limit 284. Alternatively, or in conjunction, the information displayed on the display 112 can be captured using screen capturing or replicating software, which would replicate the information displayed on the display 112.

The illustration presented in FIG. 8 also introduces two optional acquisition units that can be employed by the proctoring system: a monitor mount wide-angle digital proctoring camera 250b and a monitor mount infrared proctoring camera 250c.

The monitor mount wide-angle digital proctoring camera 250b can be employed to acquire a wider image compared to the integral webcam 210. The monitor mount wide-angle digital proctoring camera 250b would include a monitor mount digital proctoring camera wide angle lens 254. Since computers are not offered with the integral webcam 210 having a wide angle lens, the proctoring system can include the monitor mount wide-angle digital proctoring camera 250b, which would be secured to a top edge of the monitor frame 110 by the monitor mount proctoring camera attachment base 257. The wide angle lens enables acquisition of at least one of, but preferably all of: the user's hands, the examination keyboard, the examinee's face, the examination desk, and the like.

The monitor mount infrared proctoring camera 250c can be employed to identify when any person other than the examinee 290 enters the examination area. The monitor mount infrared proctoring camera 250c includes at least one monitor mount proctoring camera infrared lens 255. The monitor mount infrared proctoring camera 250c is preferably capable of acquiring infrared imaging within the entire examination area. This can include a monitor mount infrared proctoring camera 250c capable of monitoring at least a 90 degree viewing angle, at least a 180 degree viewing angle, or a 360 degree viewing angle. The minimum viewing angle would be determined by the location and orientation of the monitor mount infrared proctoring camera 250c during the examination process. For example, if the monitor mount infrared proctoring camera 250c is placed in a corner, the monitor mount infrared proctoring camera 250c would only need to cover a 90 degree viewing angle. In another example, if the monitor mount infrared proctoring camera 250c is placed against a wall, the monitor mount infrared proctoring camera 250c would only need to cover a 180 degree viewing angle. In yet another example, if the monitor mount infrared proctoring camera 250c is placed in a middle of an open area, the monitor mount infrared proctoring camera 250c would need to cover a 360 degree viewing angle.

The use of at least one monitor mount proctoring camera infrared lens 255 enables a process for identifying a person other than the examinee 290 enters the examination area without invading the privacy of at least one of the examinee 290 and the person other than the examinee 290.

In an alternative arrangement, the monitor mount infrared proctoring camera 250c can be replaced or supplemented by a motion detection device. The motion detection device would provide the same benefits as the monitor mount infrared proctoring camera 250c. The motion detection device can be monitored via software (a motion detection device instruction set). Either the motion detection device or the motion detection device instruction set can be arranged to exclude an area where the examinee 290 is located, such as the area identified as the webcam field of view 211 in FIG. 2, as the examinee 290 is expected to move. Alternatively, the motion detection device instruction set can identify movement of the examinee 290 and extract that motion from motion detected by the motion detection device to avoid false alerts. The motion detection device can be arranged in a manner mimicking the arrangement of the monitor mount infrared proctoring camera 250c; being at 90 degrees, 180 degrees, 360 degree, or any other suitable orientation to detect any unexpected motion within the testing location.

Although the monitor mount multi-lens digital proctoring camera 250a, the monitor mount wide-angle digital proctoring camera 250b, and the monitor mount infrared proctoring camera 250c are illustrated as separate image acquisition systems, two or more can be integrated into a single assembly, thus combining functions and simplifying installation of the proctoring system.

Although the illustrations present several exemplary arrangements for a test proctoring system 200, it is understood that the test proctoring system can be implemented in any of a variety of arrangements to achieve the desired results of capturing information presented on the display 112, actions of the examinee 290, keystrokes of the computer keyboard 104, use of materials (documents, electronic devices, peripheral devices, and the like) on the testing workstation tabletop 410, timestamps for synchronization, activity within an environment of the test administrating station 100, and the like.

The system can be adapted for use with test administering computers 100, 502 utilizing multiple computer displays. The proctor examinee station software 314 can capture video from each of the multiple computer displays. The digital proctoring cameras 220, 230 can be arranged to acquire video of each or all of the multiple computer displays. The process can include a step of utilizing one or more of the digital proctoring cameras 220, 230 to acquire and submit video of the entire environment to ensure that any unauthorized items are not within the test administration area.

The system can include a variety of verification processes. The system can include steps for: (a) authenticating the examinee 290, (b) determining a location of the test administering laptop computer 100 and the examinee 290 during administration of an exam, (c) identifying any and all communication devices 700 in a proximity of the test administering laptop computer 100 during administration of the exam, (d) ensuring a proctoring application is active on each of the communication devices 700 in a proximity of the test administering laptop computer 100 during administration of the exam, (e) recording a screen of each of the communication devices 700 in the proximity of the test administering laptop computer 100 during administration of the exam.

Figure 9:
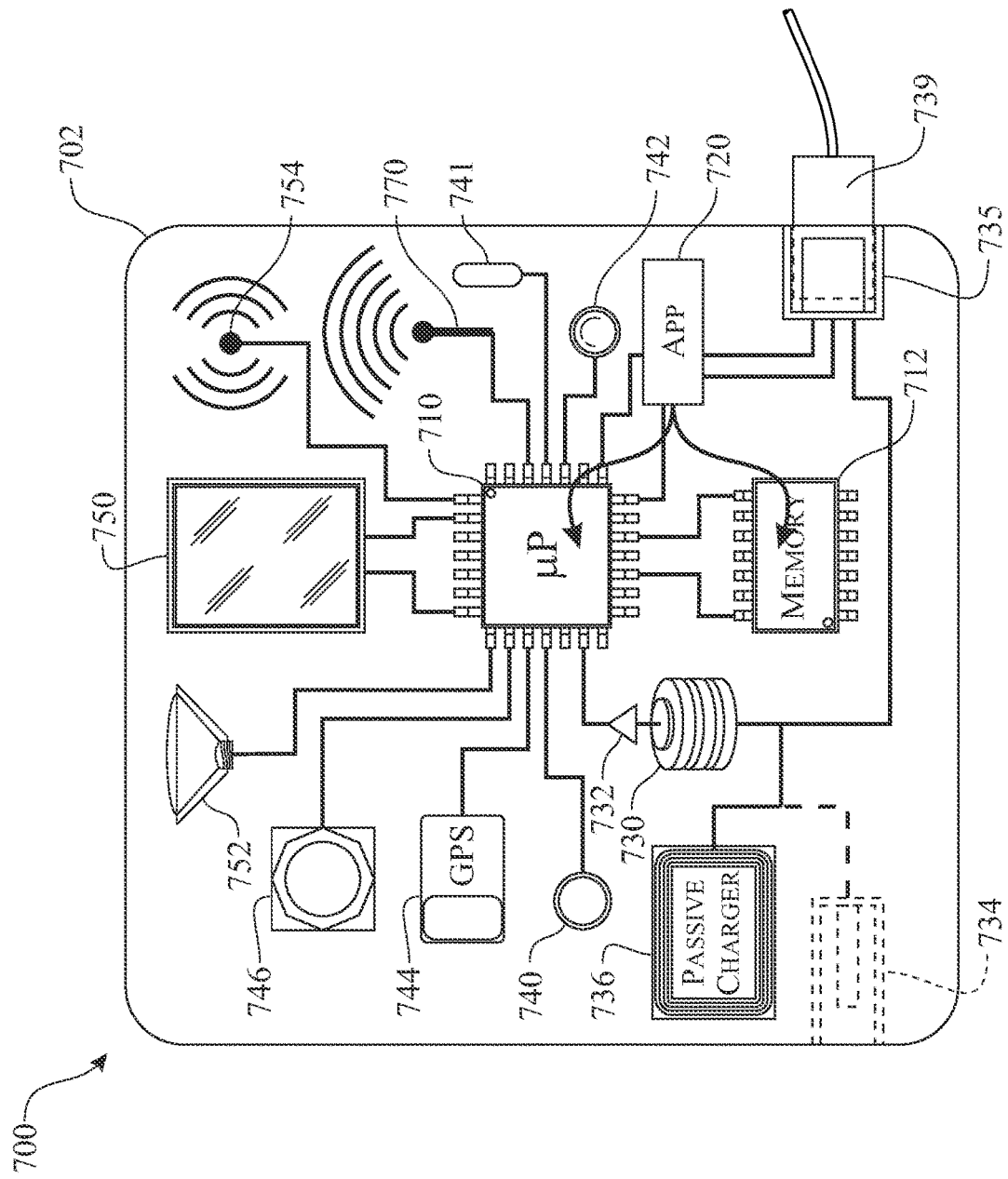
FIG. 9 presents an exemplary schematic diagram introducing a exemplary components of a portable communicating device.
Figure 10:
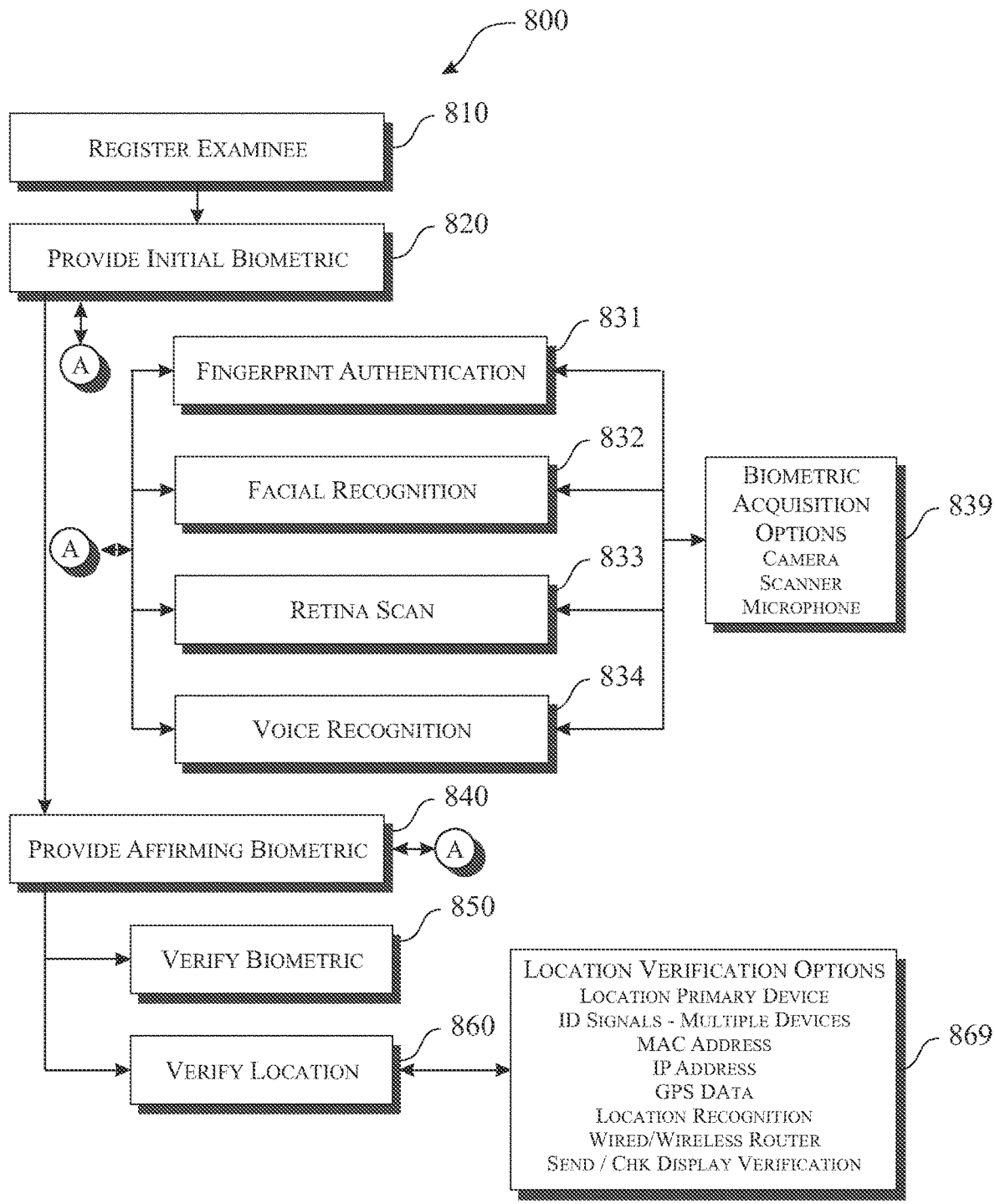
FIG. 10 presents an exemplary flow diagram illustrating a process for authentication of an examinee and authentication of a location in which the examinee is being administered a test.

A schematic diagram identifying key components of an exemplary portable computing/communicating device 700 is illustrated in FIG. 9. The portable computing/communicating device 700 can be a Smartphone (as illustrated), a portable computing tablet, a Personal Data Assistant (PDA), a custom portable computing device, a paging device, an alpha-numeric paging device, and the like. The portable computing/communicating device 700 includes a portable computing device microprocessor 710. A proctoring application 720 provides an instruction set for operating the application on the portable computing device microprocessor 710 in conjunction with other instruction sets. The proctoring application 720 is commonly stored within a portable computing device non-volatile digital memory 712. The portable computing device non-volatile digital memory 712 is in digital signal communication with the portable computing device microprocessor 710. Electrical power is provided to the portable computing device microprocessor 710 from (a) an external power source, identified as a line power input 734 and/or (b) an integrated portable power supply 730. The integrated portable power supply 730 is commonly rechargeable. The integrated portable power supply 730 can be recharged by power from the line power input 734, power provided through a wired USB communication cable 739 or a Universal Serial Bus (USB) port 735, using a wireless power charging circuit 736, using another portable power supply, using a solar charger (not illustrated), and the like. A power regulator 732 can be integrated into the circuit to provide power management to all of the electrically operated components of the portable computing/communicating device 700.

A mechanical user input device 740 would be integrated into the portable computing/communicating device 700. The mechanical user input device 740 would be in signal communication with the portable computing device microprocessor 710. The mechanical user input device 740 is adapted to receive inputs from the individual using the portable computing/communicating device 700. The mechanical user input device 740 can be of any suitable user entry device known to those skilled in the art, such as an electro-mechanical switch, a touchpad or track pad, a keyboard, a trackball, and the like. An audio input device 741 would be integrated into the portable computing/communicating device 700. The audio input device 741 would be in signal communication with the portable computing device microprocessor 710. The audio input device 741 is adapted to receive audio inputs from the individual using the portable computing/communicating device 700. The audio input device 741 can be of any suitable audio entry device known to those skilled in the art, typically a microphone.

The portable computing/communicating device 700 can provide output to the user through any of a variety of components. The portable computing/communicating device 700 can convey information via at least one output device, which can be conveyed visually, using a display 750, audibly, using a speaker 752, motion, using a haptic feedback generator 754, and the like. The audio feedback, the visual feedback and the haptic feedback can be operated individually, or in combination with at least one other feedback. The display 750 would be directly or indirectly in signal communication with the portable computing device microprocessor 710. Images can be provided by a display driver (not shown). The speaker 752 and the haptic feedback generator 754 would be operated by a signal from the portable computing device microprocessor 710. A camera 742 can be included in the portable computing/communicating device 700. The camera 742 can be utilized to capture digital still photographs or digital video as desired. The digital still photographs or digital video can be used by the weight management system processing steps 132 to aid in determining the health index number. Other components or circuitry can be integrated into the portable computing/communicating device 700 to provide additional information to the portable computing device microprocessor 710 for use with the proctoring application 720. For example, a Global Position System (GPS) receiver 744 can be integrated into the portable computing/communicating device 700. The Global Position System (GPS) receiver 744 introduces a capability to acquire location information, movement information, and the like of the portable computing/communicating device 700. Similarly, an accelerometer 746 can be integrated into the portable computing/communicating device 700. The accelerometer 746 introduces a capability to different movement information, and the like of the portable computing/communicating device 700. The movement information acquired using the Global Position System (GPS) receiver 744 and/or the accelerometer 746 can be related to a user's activities. The acquired movement information can be used by the proctoring application 720 for maintaining a history of the activities of the user.

The portable computing/communicating device 700 can communicate with external devices using any suitable wired and/or wireless communication circuits and protocols. In the exemplary illustration, the portable computing/communicating device 700 includes each of a wired communication circuit (a Universal Serial Bus (USB) port 735) and a wireless communication circuit 770. The Universal Serial Bus (USB) port 735 can additionally be utilized to convey signal or data information.

Biometrics can be utilized for authentication of the examinee 290, as outlined in an examinee and location authentication process 800 presented in FIG. 9. The examinee 290 would register (block 810) in accordance with any established registration process. The registration process can be accomplished in person, via a mail-in process, using an on-line registration process, using a video registration process, using a chat registration process, or any other suitable registration process, or any combination thereof. In conjunction with the registration process, the examinee 290 would select one or more forms of a biometric for identify verification and provide the selected one or more forms of a biometric authentication to a registration receiving party. Examples of one or more forms of a biometric authentication include a fingerprint authentication 831, facial recognition 832, a retina scan 833, voice recognition 834, or any other suitable biometric authentication. The biometric authentication can be captured using biometric acquisition options 839, which can be the digital camera 842, the scanning device 840, the microphone 841, or any other suitable biometric acquisition device, or any combination thereof. The provided identify verification biometric would be stored by the proctoring party for identify verification at the time of administration of the test.

During a check in period immediately prior to administering of the test, the examinee 290 would provide a newly captured affirming biometric image (block 840) for comparison to the biometric authentication (block 820) provided during registration (block 810). The authentication process can require one or more types of biometric images. Once the newly captured affirming biometric image (block 840) is obtained by the proctoring agency, the proctoring agency would compare the newly captured affirming biometric image (block 840) against the biometric authentication (block 820) provided during registration (block 810) to verify the identity of the examinee 290 (block 850).

The system can additionally verify a location (block 860) where the newly captured affirming biometric image (block 840) occurred. A location where the newly captured affirming biometric image (block 840) occurs can be determined by identifying a location of the device used to capture the affirming biometric image (block 840). The location of the device used to capture the affirming biometric image (block 840) can be determined using any location identification processes (block 869).

A first example of a location identification process is a use of encoded device names of various wireless protocols, such as Wi-Fi, Bluetooth, etc. as identified by a router, a beacon, or any other signal receiving device with a known geographical location. The system utilizes the router, beacon, or any other signal receiving device to determine the location identification of the device used to acquire the affirming biometric image (block 840). These devices (routers, beacons, or any other like protocol receiving devices) have a known geographical location or the geographical location can be identified by the Internet Protocol (IP) address thereof.

A second example utilizes a media access control address (MAC address) to identify the location of the device used to acquire the affirming biometric image (block 840). The media access control address (MAC address) is included in the wireless transmission of the portable computing/communicating device 700.

A third option utilizes the Internet Protocol (IP) address of either the device used to acquire the affirming biometric image (block 840) or an Internet Protocol (IP) address of a router located proximate to and having signal communication with the device used to acquire the affirming biometric image (block 840). The IP address can be used to identify a geographical location of each device on the Internet. The process of utilizing IP addresses for identification of the geographical location of a device is well known.

A fourth option is to use a GPS receiver 744 of the portable computing/communicating device 700 to determine the geographical location of the device used to acquire the affirming biometric image (block 840). The GPS location information determined by the GPS receiver 744 of the device used to acquire the affirming biometric image (block 840) can be transmitted to the proctoring party via the proctoring application 720, via an interrogation process, or via any other process for obtaining information from the device used to acquire the affirming biometric image (block 840).

In another approach, the proctoring party can transmit a signal to the device used to acquire the affirming biometric image (block 840). The signal would include indicia that would be displayed on the device used to acquire the affirming biometric image (block 840). In one solution, the signal can be conveyed via the proctoring application 720. In another solution, the signal can be directed towards an Internet Protocol (IP) address of the device used to acquire the affirming biometric image (block 840) and/or a media access control address (MAC address). In yet another solution, the signal can be sent via a messaging application. In some solutions, the examinee 290 would be required to respond to the transmitted signal/indicia to verify receipt. The response can include location information, such as metadata.

The location identification processes described herein are only exemplary and the process can be accomplished using any location identification process known by those skilled in the art to determine the geographic location of any device capable of acquiring the affirming biometric image (block 840).

Figure 11:
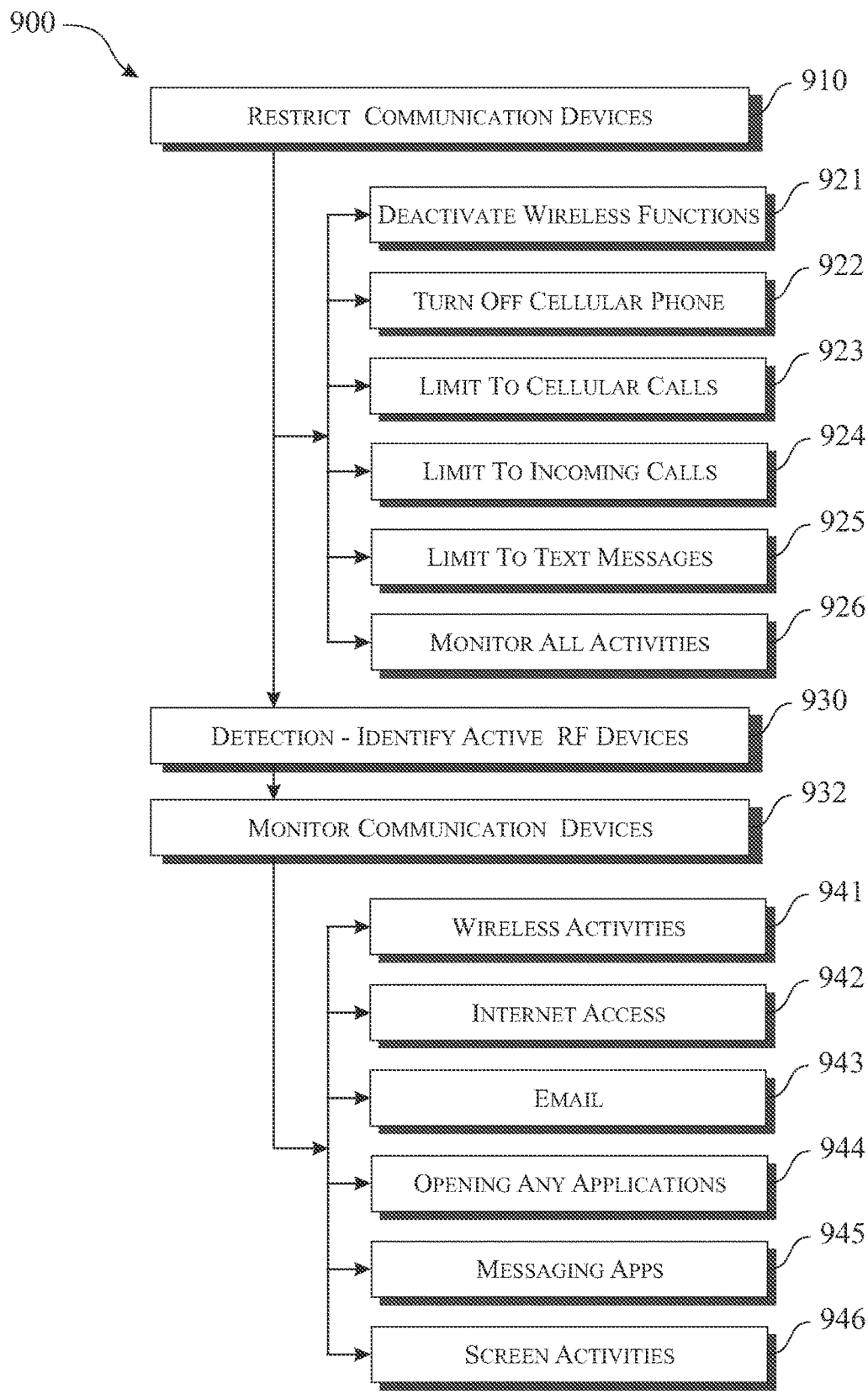
FIG. 11 presents an exemplary flow diagram illustrating processes for detecting and monitoring communication devices within a test administration location.

The examinee 290 can have at least one portable computing/communicating device 700 in their possession. There may be conditions that warrant the examinee 290 having at least one portable computing/communicating device 700 in their possession. The examinee 290 may require at least one portable computing/communicating device 700 for notification of an emergency, monitoring another person, monitoring a pet, or any other reasonable scenario. The proctoring party may require installation of the proctoring application 720 onto each portable computing/communicating device 700. The proctoring application 720 can be used to manage and/or monitor activities on each portable computing/communicating device 700, as described in a communication device detection and monitoring process 900 illustrated in FIG. 11. The proctoring application 720 would be activated on each respective portable computing/communicating device 700. The proctoring application 720 would include a capability to restrict activities on the portable computing/communicating device 700 (block 910). The restrictions can be preset, established by the proctoring party, or established by the examinee 290.

A first exemplary restriction would be to disable the wireless communication circuit 770 (block 921). This would ensure that the portable computing/communicating device 700 is unable to use a portion or all of the wireless interfaces to communicate with any other device. The proctoring application 720 can deactivate all of the wireless communication protocols, or a portion of the wireless communication protocols, leaving one or more wireless communication protocols active. Examples of the wireless communication protocols include cellular, Wi-Fi, Bluetooth, Near Field Communications (NFC), and the like. A second exemplary restriction would be to disable a cellular portion of the wireless communication circuit 770 (block 922). A third exemplary restriction would be to disable all wireless communications except the cellular portion of the wireless communication circuit 770 (block 923). A fourth exemplary restriction would be to restrict the cellular portion of the wireless communication circuit 770 to receiving incoming calls (block 924). Incoming calls can utilize the cellular portion of the wireless communication circuit 770, the Wi-Fi portion of the wireless communication circuit 770 for enabling Voice Over Internet Protocol (VOIP) calls, or any other known telephone call protocols. A fifth exemplary restriction would be to restrict the portable computing/communicating device 700 to only text messaging (block 925). This can include limits on only receiving text messages, only transmitting text messages, or both. When referring to text messages, the text messages can be a text messaging application or any other messaging formats by other messaging applications. The proctoring application 720 can limit the messaging to a single messaging application or multiple messaging applications (block 925).

The proctoring application 720 can include a feature that monitors all activities on the portable computing/communicating device 700 (block 926). In one solution, the proctoring application 720 would record all activities presented on the display 750 of the portable computing/communicating device 700. The recording can initiate in conjunction with the initiation of the proctoring application 720 or the initiation of the administration of the exam. The proctoring party can transmit a signal indicating the administration of the exam. The recording would continue until either the examinee 290 completes the exam or the administration of the exam terminates. When the examinee 290 completes the exam, the examinee 290 can indicate that the examinee 290 has completed the exam by notifying the proctoring party using a predetermined notification procedure. Then the time period for the exam expires, the proctoring party can transmit a signal indicating the period for administering the exam has concluded. Upon receipt of the signal indicating the period for administering the exam has concluded, the proctoring application 720 would terminate the recording process. The proctoring application 720 would then forward the recording in its entirety to the proctoring party for retention. The recording can be retained until deemed no longer beneficial or necessary. In another solution, the proctoring application 720 can monitor all activities of each portable computing/communicating device 700. The proctoring application 720 can include software that can determine and make of record a source of each activity and/or communication link. The software can determine if any communications are generated using information provided by a live individual, any artificially generated information, or any other source. The communication can additionally be monitored using any intermediary device, such as the router 350, a Bluetooth monitoring device (can be embedded within the router 350), or any other RF monitoring device. The monitoring can identify, decode and record any wireless communications that include any of the RF devices located within the test examination area. One such example is referred to as Bluetooth surveillance.

In addition to the visual recording of the display 750, the proctoring application 720 can record all audio activities conveyed through the portable computing/communicating device 700. During periods where the portable computing/communicating device 700 would be dormant (locked), the recording can mark the time and then halt the recording process. When the portable computing/communicating device 700 is activated (unlocked) the proctoring application 720 would mark the time and resume the recording process. The recordings can be shared with the proctoring party in real time, in segmented periods of time, or following the completion of the administration of the exam.

The proctoring party can monitor the recorded activities in real time or as provided. The recordings can be reviewed manually, using software operating on a computer, using artificial intelligence software operating on a computer, or any other method of identifying any anomalies in the recorded activities. The recording and/or review process can identify when one function operating on the portable computing/communicating device 700 initiates and/or has a new activity. The recording can include a marker enabling easy identification of the event by the proctoring party. Alternatively, the automated review process can identify when one function operating on the portable computing/communicating device 700 initiates and/or has a new activity.

The proctoring system can include at least one process for detecting all Radio Frequency (RF) active devices (block 930). An RF detection device can be provided to the examinee 290 by the proctoring service to detect RF active devices. Examples of devices that can be used as the RF detection device include a router, a beacon, or any other signal receiving device. In an alternative application, the wireless communication circuitry of the exam administering device 100 can be used to detect RF active devices.

Detection of RF active devices can be accomplished using any RF detection process known by those skilled in the art. In one solution, the RF active device can be identified by searching for encoded device names of various wireless protocols, such as Wi-Fi, Bluetooth, etc. In a second solution, the RF active device can be identified by searching for Internet Protocol (IP) addresses and/or media access control addresses (MAC addresses) of electronic devices located in a proximity of the exam administering device 100.

The RF detection device is preferably configured to communicate with the proctoring party. The RF detection device would report all identified RF active devices. The examinee 290 can then present each of the identified RF active devices to the proctoring party. Alternatively, the proctoring application 720 installed on each portable computing/communicating device 700 would communicate with the proctoring company to verify that the proctoring application 720 is active on the respective portable computing/communicating device 700.

The system can additionally employed wired monitoring processes and/or thermal detecting processes and associated equipment as previously described within this disclosure to identify any and all active electronic devices located within the test administering area.

One or more photographs (or video) of any and all portable computing/communicating devices 700 can be obtained and forwarded to the proctor exam monitoring server 310. The photographs or video can be acquired by the examinee 290 and/or the digital proctoring cameras 220, 230, 240, 250. The user of each of the portable computing/communicating devices 700 can instruct the respective portable computing/communicating device 700 to display any/all device identifying information on the display 750 of the respective portable computing/communicating device 700.

The device identifying information can include at least one of:
 a) device information associated with the respective portable computing/communicating device,
 b) a serial number of the device,
 c) a model of the device,
 d) a version of operating software of the device,
 e) an International Mobile Equipment Identity (IMEI) of the device,
 f) a telephone number assigned to the device,
 g) an Internet Protocol (IP) address assigned to the respective portable computing/communicating device, and
 h) a media access control address (MAC address) assigned to the respective portable computing/communicating device.

An image of the displayed information can be acquired using any triggering process. The acquired image can be accessed by the proctor exam monitoring server 310 using any known access process, including transmission of the acquired image to the proctor exam monitoring server 310, the proctor exam monitoring server 310 can remotely access the acquired images on the respective image acquisition device, or any other means for accessing the acquired images. Acquisition of the image of the displayed information can be completed by taking a photo of each portable computing/communicating device 700, taking a screen shot from each portable computing/communicating device 700, or any other suitable process of acquiring an image displaying the identifying information. Transfer of the acquired images can be completed using any suitable electronic file transfer method. In a preferred solution, the acquired images can be transferred using automated processes included in the proctoring application 720.

The system can continuously monitor for activity of each portable computing/communicating device 700 (block 932) and report such activity to the proctoring party accordingly. The system would be particularly focused to identify communication activities on each portable computing/communicating device 700. Examples of communication activities include wireless activities (block 941), internet access (block 942), email transmissions (block 943), and messaging applications (block 945). In addition to monitoring for any communication activities, the proctoring application 720 can additionally monitor for opening of any applications (block 944). The proctoring application 720 continues to monitor and/or record screen activities (block 946).

The proctoring system would continuously monitor for detection of any change in RF signals and report any changes to the proctoring party accordingly (block 930).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF NO. DESCRIPTION

- 100 test administering laptop computer
- 100A first examinee testing station
- 100B second examinee testing station
- 100n nth examinee testing station
- 102 laptop computer base
- 104 computer keyboard
- 106 computer input interface pointing device
- 110 monitor frame
- 112 display
- 119 monitor hinge
- 200 proctoring acquisition system
- 210 integral webcam
- 211 webcam field of view
- 212 microphone
- 220 first digital proctoring camera
- 221 first digital proctoring camera field of view
- 222 first digital proctoring camera stand
- 224 first digital proctoring camera power and data cable
- 226 first digital proctoring camera power and data cable connector
- 228 first digital proctoring camera mount
- 230 second digital proctoring camera
- 231 second digital proctoring camera field of view
- 232 second digital proctoring camera stand
- 234 second digital proctoring camera power and data cable
- 240 third digital proctoring camera
- 241 third digital proctoring camera field of view
- 248 third digital proctoring camera mount
- 250 monitor mount digital proctoring camera
- 250a monitor mount multi-lens digital proctoring camera
- 250b monitor mount wide-angle digital proctoring camera
- 250c monitor mount infrared proctoring camera
- 251 monitor mount digital proctoring camera field of view
- 252 monitor mount digital proctoring camera support member
- 253 monitor mount digital proctoring camera lens
- 254 monitor mount digital proctoring camera wide angle lens
- 255 monitor mount proctoring camera infrared lens
- 257 monitor mount proctoring camera attachment base
- 258 monitor mount digital proctoring camera frame grip
- 260 first display reference marker
- 262 second display reference marker
- 264 first keyboard reference marker
- 266 second keyboard reference marker
- 270 privacy filter
- 272 privacy filter frame
- 274 privacy filter screen
- 276 privacy filter retention member
- 278 privacy filter webcam aperture
- 280 privacy filter examinee viewing angle
- 282 privacy filter right viewing angle limit
- 284 privacy filter left viewing angle limit
- 290 examinee
- 292 examinee right hand
- 294 examinee left hand
- 300 proctor exam monitoring system
- 310 proctor exam monitoring server
- 311 proctoring monitor
- 312 proctor exam monitoring server digital storage media
- 313 proctoring monitor display
- 314 proctor examinee station software
- 316 proctor exam monitoring software
- 318 proctor exam monitoring artificial intelligence software
- 320 test administrating server
- 322 test administrating server digital storage media
- 324 test administrating software
- 330A first examinee monitoring window
- 331A first examinee identifier
- 332A first examinee monitoring window first camera video
- 334A first examinee monitoring window second camera video
- 336A first examinee monitoring window nth camera video
- 338A first examinee artificial intelligence alert
- 330B second examinee monitoring window
- 331B second examinee identifier
- 332B second examinee monitoring window first camera video
- 334B second examinee monitoring window second camera video
- 336B second examinee monitoring window nth camera video
- 338B second examinee artificial intelligence alert
- 331n nth examinee identifier
- 332n nth examinee monitoring window first camera video
- 334n nth examinee monitoring window second camera video
- 336n nth examinee monitoring window nth camera video
- 338n nth examinee artificial intelligence alert
- 350 network controlling/routing system
- 410 testing workstation tabletop
- 412 testing workstation stand
- 414 testing workstation keyboard support platform
- 416 testing workstation keyboard support assembly
- 420 testing workstation distal right corner
- 422 testing workstation distal left corner
- 424 testing workstation proximal right corner
- 426 testing workstation proximal left corner
- 440 paper product
- 450 floor
- 452 wall 460 examinee chair
462 examinee chair seat
464 examinee chair base
466 examinee chair seat back
500 test administering desktop computing system
502 test administering desktop computer
504 computer keyboard
510 monitor frame
514 monitor frame stand
600 test proctoring method
610 obtain test proctoring kit
612 install proctoring software on examinee computer
614 arrange proctoring cameras as directed
616 activate proctoring software on examinee computer
618 validate arrangement of proctoring kit with proctoring company
620 scan and present papers to proctoring company (prior to exam)
622 present electronic devices to proctoring company
630 download subject test
632 complete test
634 monitor testing process
636 scan and present papers to proctoring company (after exam)
638 record and store video, screen, and keystrokes for traceability
700 portable computing/communicating device
702 portable computing device housing
710 portable computing device microprocessor
712 portable computing device non-volatile digital memory
720 proctoring application
730 integrated portable power supply
732 power regulator
734 line power input
735 Universal Serial Bus (USB) port
736 portable computing device wireless power charging circuit
739 wired USB communication cable
740 mechanical user input device
741 audio input device
742 camera
744 Global Position System (GPS) receiver
746 accelerometer
750 display
752 speaker
754 haptic feedback generator
770 wireless communication circuit
800 examinee and location authentication process
810 register examinee
820 provide initial biometric step
831 fingerprint authentication
832 facial recognition
833 retina scan
834 voice recognition
839 biometric acquisition options
840 provide affirming biometric step
850 verify biometric step
860 verify location step
869 location verification options
900 communication device detection and monitoring process
910 restrict functions on communication devices step
921 deactivate wireless functionality
922 turn off cellular telephone
923 restrict functions to cellular calls
924 restrict functions to incoming cellular calls
925 restrict functions to text messaging
926 monitor all activities on communication device
930 detection-identify active rf devices
932 monitor cellular phone/external devices
941 wireless activities
942 internet access
943 email
944 opening any applications
945 messaging apps
946 screen activities

What is claimed is:

1. A proctoring system used during administration of a test, the proctoring system comprising:
a proctoring software operating on a microprocessor of a proctoring server;
at least one of: (a) a wired and (b) a wireless communication device providing a communication link between the proctoring server and a test administering computing device;
a proctoring application installed on at least one portable computing/communicating device; and
a communication monitoring device in signal communication with the proctoring server;
the proctoring application comprising steps of:
identifying each of the at least one portable computing/communicating device located within a test administration area,
monitoring activity of each of the at least one portable computing/communicating device located within the test administration area; and
the proctoring software comprising steps of:
accessing the monitored activity of each of the at least one portable computing/communicating device located within the test administration area,
reviewing the monitored activity of each of the at least one portable computing/communicating device located within the test administration area to determine if any potentially illicit activity has occurred on any of the at least one portable computing/communicating device located within the test administration area,
monitoring the test administration area to identify any wireless communications within the test examination area using the communication monitoring device,
recording all wireless communications identified within the test examination area, restricting communication on the one or more of the at least one portable computing/communicating device to only the communication link with the proctoring server,
identifying any potentially illicit activity on the monitored activity of each of the at least one portable computing/communicating device located within the test administration area, and
reporting the identified potentially illicit activity on the monitored activity of each of the at least one portable computing/communicating device located within the test administration area.

2. The proctoring system as recited in claim 1, further comprising steps of:
identifying a start time of an examination period, and
initiating a proctoring portion of the proctoring application at the start time of the examination period.

3. The proctoring system as recited in claim 1, further comprising steps of:
identifying a termination time of an examination period, and terminating the proctoring portion of a proctoring application at the termination time of the examination period.

4. The proctoring system as recited in claim 1, further comprising a step of recording the activity of one or more of the at least one portable computing/communicating device located within the test administration area.

5. The proctoring system as recited in claim 4, wherein the step of recording the activity of one or more of the at least one portable computing/communicating device located within the test administration area is accomplished by a screen image recording function of the respective portable computing/communicating device.

6. The proctoring system as recited in claim 4, wherein the step of recording the activity of the one or more of the at least one portable computing/communicating device located within the test administration area only occurs when the respective portable computing/communicating device is unlocked and pauses when the respective portable computing/communicating device is locked.

7. The proctoring system as recited in claim 4, wherein the recorded activity of the one or more of the at least one portable computing/communicating device located within the test administration area is a video recording of information displayed upon a display of the respective portable computing/communicating device.

8. The proctoring system as recited in claim 7, wherein the step of recording the activity of the one or more of the at least one portable computing/communicating device located within the test administration area only occurs when the respective portable computing/communicating device is unlocked and pauses when the respective portable computing/communicating device is locked.

9. The proctoring system as recited in claim 4, wherein the recorded activity of the one or more of the at least one portable computing/communicating device located within the test administration area is a video recording of information displayed upon a display of the respective portable computing/communicating device, wherein the recording is acquired using a video recorder that is independent from the respective portable computing/communicating device.

10. The proctoring system as recited in claim 1, wherein the step of identifying each of the at least one portable computing/communicating device located within the test administration area is accomplished by at least one of:
  a) using a thermal sensor to identify powered on electronic devices,
  b) using a Radio Frequency (RF) detection device to identify RF signals emitted from the at least one portable computing/communicating device,
  c) using a device name integrated into a wireless transmission protocol packet,
  d) using an Internet Protocol (IP) address identified by a router,
  e) using a media access control address (MAC address) identified by the router,
  f) using a Global Positioning System receiving integrated into one or more of the at least one portable computing/communicating device,
  g) using a reporting function of the proctoring application installed on one or more of the at least one portable computing/communicating device, and
  h) using at least one camera to acquire at least one image of the test administration area.

11. The proctoring system as recited in claim 1, further comprising a step of acquiring at least one of an image and video of a screen of one or more of the at least one portable computing/communicating device, wherein an image displayed upon the screen includes at least one of:
  a) device information associated with the respective portable computing/communicating device,
  b) a serial number of the device,
  c) a model of the device,
  d) a version of operating software of the device,
  e) an International Mobile Equipment Identity (IMEI) of the device,
  f) a telephone number assigned to the device,
  g) an Internet Protocol (IP) address assigned to the respective portable computing/communicating device, and
  h) a media access control address (MAC address) assigned to the respective portable computing/communicating device.

12. The proctoring system as recited in claim 1, further comprising a step of restricting communication on the one or more of the at least one portable computing/communicating device, wherein the step of restricting communication includes at least one of:
  a) deactivating wireless functions,
  b) deactivating a cellular function,
  c) limiting communication to the cellular function,
  d) deactivating a Voice Over Internet Protocol (VOIP) communication function,
  e) limiting communication to the Voice Over Internet Protocol (VOIP) communication,
  f) limiting communication to incoming telephone calls,
  g) limiting communication to one or more messaging applications,
  h) limiting communication to incoming messages using one or more of the messaging applications,
  i) limiting communication to text messages,
  j) limiting communication to incoming text messages,
  k) limiting communication to email messages, and
  l) Limiting communication to incoming email messages.

13. A proctoring system used during administration of a test, the proctoring system comprising:
  a proctoring software operating on microprocessor of a proctoring server;
  at least one of: (a) a wired and (b) a wireless communication device providing a communication link between the proctoring server and a test administering computing device; and
  a proctoring application installed on at least one portable computing/communicating device;
  the proctoring application comprising steps of:
    identifying each of the at least one portable computing/communicating device located within a test administration area,
    acquiring at least one biometric of the examinee using at least one of a camera, a scanner, and a microphone in communication with the portable computing/communicating device located within the test administration area;
    authenticating the examinee using the at least one biometric acquired from the examinee prior to initiating the examination; and
    recording activity of each of the at least one portable computing/communicating device located within the test administration area, wherein the step of recording activity of each of the at least one portable computing/communicating device located within the test administration area is initiated at a time proximate a start time of an examination period;
  the proctoring software comprising steps of:

accessing the recorded activity of each of the at least one portable computing/communicating device located within the test administration area, reviewing the recorded activity of each of the at least one portable computing/communicating device located within the test administration area to determine if any potentially illicit activity has occurred on any of the at least one portable computing/communicating device located within the test administration area, monitoring the test administration area to identify any wireless communications within the test administration area using the communication monitoring device, recording all wireless communications identified within the test administration area, restricting communication on the one or more of the at least one portable computing/communicating device to only the communication link with the proctoring server, identifying any of the potentially illicit activity on the recorded activity of each of the at least one portable computing/communicating device located within the test administration area, and reporting the identified potentially illicit activity on the recorded activity of each of the at least one portable computing/communicating device located within the test administration area.

14. The proctoring system as recited in claim 13, further comprising a step of identifying the start time of the examination period, and initiating a proctoring portion of the proctoring application at the start time of the examination period.

15. The proctoring system as recited in claim 13, further comprising a step of identifying a termination time of the examination period, and terminating a proctoring portion of the proctoring application at the termination time of the examination period.

16. The proctoring system as recited in claim 13, wherein the step of recording activity of each of the at least one portable computing/communicating device located within the test administration area is accomplished by a screen image recording function of the respective portable computing/communicating device.

17. The proctoring system as recited in claim 13, wherein the step of recording activity of each of the at least one portable computing/communicating device located within the test administration area only occurs when the respective portable computing/communicating device is unlocked and pauses when the respective portable computing/communicating device is locked.

18. The proctoring system as recited in claim 13, wherein the recorded activity of each of the at least one portable computing/communicating device located within the test administration area is a video recording of information displayed upon a display of the respective portable computing/communicating device.

19. The proctoring system as recited in claim 18, wherein the step of recording activity of each of the at least one portable computing/communicating device located within the test administration area only occurs when the respective portable computing/communicating device is unlocked and pauses when the respective portable computing/communicating device is locked.

20. The proctoring system as recited in claim 13, wherein the recorded activity of each of the at least one portable computing/communicating device located within the test administration area is a video recording of information displayed upon a display of the respective portable computing/communicating device, wherein the recording is acquired using a video recorder that is independent from the respective portable computing/communicating device.

21. The proctoring system as recited in claim 13, wherein the step of identifying each of the at least one portable computing/communicating device located within the test administration area is accomplished by at least one of:
 a) using a thermal sensor to identify powered on electronic devices,
 b) using a Radio Frequency (RF) detection device to identify RF signals emitted from the at least one portable computing/communicating device,
 c) using a device name integrated into a wireless transmission protocol packet,
 d) using an Internet Protocol (IP) address identified by a router,
 e) using a media access control address (MAC address) identified by a router,
 f) using a Global Positioning System receiving integrated into one or more of the at least one portable computing/communicating device,
 g) using a reporting function of the proctoring application installed on one or more of the at least one portable computing/communicating device, and
 h) using at least one camera to acquire at least one image of the test administration area.

22. The proctoring system as recited in claim 13, further comprising a step of acquiring at least one of an image and video of a screen of one or more of the at least one portable computing/communicating device, wherein an image displayed upon the screen includes at least one of:
 a) device information associated with the respective portable computing/communicating device,
 b) a serial number of the device,
 c) a model of the device,
 d) a version of operating software of the device,
 e) an International Mobile Equipment Identity (IMEI) of the device,
 f) a telephone number assigned to the device,
 g) an Internet Protocol (IP) address assigned to the respective portable computing/communicating device, and
 h) a media access control address (MAC address) assigned to the respective portable computing/communicating device.

23. The proctoring system as recited in claim 13, further comprising a step of restricting communication on the one or more of the at least one portable computing/communicating device, wherein the step of restricting communication includes at least one of:
 a) deactivating wireless functions,
 b) deactivating a cellular function,
 c) limiting communication to the cellular function,
 d) deactivating a Voice Over Internet Protocol (VOIP) communication function,
 e) limiting communication to the Voice Over Internet Protocol (VOIP) communication,
 f) limiting communication to incoming telephone calls,
 g) limiting communication to one or more messaging applications,
 h) limiting communication to incoming messages using one or more of the messaging applications,
 i) limiting communication to text messages,
 j) limiting communication to incoming text messages,
 k) limiting communication to email messages, and
 l) limiting communication to incoming email messages.

24. The proctoring system as recited in claim 1, the proctoring application further comprising steps of:
acquiring at least one biometric of the examinee using at least one of a camera, a scanner, and a microphone in communication with the portable computing/communicating device located within the test administration area; and
authenticating the examinee using the at least one biometric acquired from the examinee prior to initiating the examination.

25. The proctoring system as recited in claim 1, the proctoring system further comprising a motion sensing device arranged for monitoring for a motion exclusive of a geographic fenced region surrounding the examinee, the motion sensing device in signal communication with the proctoring server;
the proctoring software comprising further comprising steps of:
monitoring for any motion between a perimeter of the test administration area and a perimeter of the geographic fenced region surrounding the examinee using the motion sensing device,
identifying any motion between a perimeter of the test administration area and a perimeter of the geographic fenced region surrounding the examinee, and
reporting all identified motion between a perimeter of the test administration area and a perimeter of the geographic fenced region surrounding the examinee to the proctoring server.

26. The proctoring system as recited in claim 13, the proctoring system further comprising a motion sensing device arranged for monitoring for a motion exclusive of a geographic fenced region surrounding the examinee, the motion sensing device in signal communication with the proctoring server;
the proctoring software comprising further comprising steps of:
monitoring for any motion between a perimeter of the test administration area and a perimeter of the geographic fenced region surrounding the examinee using the motion sensing device,
identifying any motion between a perimeter of the test administration area and a perimeter of the geographic fenced region surrounding the examinee, and
reporting all identified motion between a perimeter of the test administration area and a perimeter of the geographic fenced region surrounding the examinee to the proctoring server.

\* \* \* \* \*